(12) United States Patent
Asami et al.

(10) Patent No.: US 11,141,817 B2
(45) Date of Patent: Oct. 12, 2021

(54) OPTICAL UNIT

(71) Applicant: OLYMPUS CORPORATION, Hachioji (JP)

(72) Inventors: Keiichi Asami, Hachioji (JP); Junichi Okubo, Hirosaki (JP)

(73) Assignee: OLYMPUS CORPORATION, Tokyo (JP)

( * ) Notice: Subject to any disclaimer, the term of this patent is extended or adjusted under 35 U.S.C. 154(b) by 274 days.

(21) Appl. No.: 16/407,820

(22) Filed: May 9, 2019

(65) Prior Publication Data

US 2019/0262943 A1    Aug. 29, 2019

Related U.S. Application Data

(63) Continuation of application No. PCT/JP2018/000856, filed on Jan. 15, 2018.

(30) Foreign Application Priority Data

Jan. 26, 2017   (JP) .............................. JP2017-012485

(51) Int. Cl.
*B23K 26/282* (2014.01)
*G02B 7/02* (2021.01)
(Continued)

(52) U.S. Cl.
CPC ............. *B23K 26/282* (2015.10); *G02B 7/00* (2013.01); *G02B 7/02* (2013.01); *G11B 7/08* (2013.01); *G11B 7/22* (2013.01)

(58) Field of Classification Search
None
See application file for complete search history.

(56) References Cited

U.S. PATENT DOCUMENTS 5,359,689 A * 10/1994 Iwatsuka ............. G02B 6/4208
                                                        385/33
2014/0078276 A1* 3/2014 Kaneko .................. A61B 1/051
                                                        348/65

(Continued)

FOREIGN PATENT DOCUMENTS

JP    H02108349 U    8/1990
JP    H07281062 A    10/1995
(Continued)

OTHER PUBLICATIONS

International Search Report (ISR) dated Apr. 10, 2018 issued in International Application No. PCT/JP2018/000856.
(Continued)

*Primary Examiner* — Tan X Dinh
(74) *Attorney, Agent, or Firm* — Holtz, Holtz & Volek PC

(57) ABSTRACT

An optical unit includes: a first optical device holding body that is sleeve-shaped and includes a first holding portion configured to hold therein at least one first optical device, and a first fitting portion extending from the first holding portion; a second optical device holding body that is sleeve-shaped and includes a second holding portion configured to hold therein at least one second optical device, and a second fitting portion extending from the second holding portion; and a welded portion that is melted and solidified over the first fitting portion and the second fitting portion in an overlapping portion between the first fitting portion and the second fitting portion. A first welding width at a center of the first fitting portion and a second welding width at a center of the second fitting portion are substantially identical in the optical axis direction of the optical unit.

3 Claims, 16 Drawing Sheets

(51) Int. Cl.
*G11B 7/22* (2006.01)
*G02B 7/00* (2021.01)
*G11B 7/08* (2006.01)

(56) References Cited

U.S. PATENT DOCUMENTS

| | | | |
|---|---|---|---|
| 2015/0145241 A1* | 5/2015 | Asami | B23K 26/70 |
| | | | 285/288.1 |
| 2017/0064164 A1 | 3/2017 | Nishihara | |
| 2019/0384031 A1* | 12/2019 | Okubo | B23K 26/0823 |
| 2019/0388175 A1* | 12/2019 | Tatsuta | A61B 1/045 |

FOREIGN PATENT DOCUMENTS

| | | | |
|---|---|---|---|
| JP | 2003021747 A | | 1/2003 |
| JP | 2008233706 A | | 10/2008 |
| JP | 2010276840 A | | 12/2010 |
| JP | 2019201108 A | * | 11/2019 |
| WO | 2015174406 A1 | | 11/2015 |

OTHER PUBLICATIONS

Written Opinion dated Apr. 10, 2018 issued in International Application No. PCT/JP2018/000856.

* cited by examiner

PRIOR ART

OPTICAL UNIT

CROSS-REFERENCE TO RELATED APPLICATION

This application is a continuation of PCT International Application No. PCT/JP2018/000856 filed on Jan. 15, 2018, which claims the benefit of priority from Japanese Patent Application No. 2017-012485, filed on Jan. 26, 2017, the entire contents of which are incorporated herein by reference.

BACKGROUND

The present disclosure relates to an optical unit including an optical device and a holder for holding the optical device.

In an optical unit used for industrial use, in order to obtain desired optical characteristics, for example, the relative position of a lens is adjusted and fixed according to the characteristics of a photoelectric conversion element (for example, refer to JP 7-281062 A). JP 7-281062 A discloses an optical unit in which holders are fixed to each other by laser welding after performing relative positional adjustment between a lens holder for holding a lens and a laser holder for holding a semiconductor laser.

FIG. 25 is a schematic diagram illustrating the configuration of a known optical unit. An optical unit 200 illustrated in the diagram includes a lens 201, an approximately tubular lens holder 202 for holding the lens 201, a semiconductor laser 203, and a tubular laser holder 204 for holding the semiconductor laser 203. The lens 201 is fixed to the lens holder 202 by soldering or adhesion using an adhesive, for example. The semiconductor laser 203 is fixed to the laser holder 204 by laser welding, for example. In addition, the central axis of the lens holder 202 and the central axis of the laser holder 204 match the optical axis $N_{200}$ of the optical unit 200.

In addition, the lens holder 202 and the laser holder 204 are fixed by laser welding after determining the relative positions of the lens 201 and the semiconductor laser 203. A specific fixing method will be described. First, after housing the laser holder 204 in the lens holder 202, the position of the laser holder 204 with respect to the lens holder 202 is adjusted so that the lens 201 and the semiconductor laser 203 are positioned to satisfy optical conditions set in advance. The optical conditions at this time are conditions for the optical unit 200 to satisfy desired optical characteristics. The position of the laser holder 204 is adjusted so that, for example, a distance $d_{200}$ between the lens 201 and a light source 203a of the semiconductor laser 203 is a distance set in advance. Thereafter, laser light is irradiated from the outer peripheral side of the lens holder 202 to weld the lens holder 202 and the laser holder 204 together. By this laser welding, a welded portion 205 in which respective molten portions are mixed and solidified is formed in the lens holder 202 and the laser holder 204. In this manner, the lens holder 202 and the laser holder 204 are fixed.

SUMMARY

An optical unit according to the present disclosure includes: a first optical device holding body that is sleeve-shaped and includes a first holding portion configured to hold therein at least one first optical device, and a first fitting portion extending from the first holding portion; a second optical device holding body that is sleeve-shaped and includes a second holding portion configured to hold therein at least one second optical device, and a second fitting portion extending from the second holding portion, wherein the first fitting portion and the second fitting portion are fitted together and fixed by welding an overlapping portion between the first fitting portion and the second fitting portion; and a welded portion that is melted and solidified over the first fitting portion and the second fitting portion in the overlapping portion outside a region in an optical axis direction of the optical unit between a holding surface that is a surface passing through the first holding portion and perpendicular to an optical axis of the optical unit and a holding surface that is a surface passing through the second holding portion and perpendicular to the optical axis, the welded portion being formed such that a first welding width at a center of the first fitting portion in a thickness direction of the first fitting portion and a second welding width at a center of the second fitting portion in a thickness direction of the second fitting portion are substantially identical in the optical axis direction of the optical unit, the first welding width and the second welding width being separated to each other.

The above and other features, advantages and technical and industrial significance of this disclosure will be better understood by reading the following detailed description of presently preferred embodiments of the disclosure, when considered in connection with the accompanying drawings.

DETAILED DESCRIPTION

Hereinafter, forms (hereinafter, embodiments) for carrying out the present disclosure will be described in detail with reference to the accompanying diagrams. In addition, the diagrams are schematic diagrams, and relationships or ratios between the sizes of respective portions are different from actual ones. In addition, also in the diagrams, portions in which relationships or ratios between sizes are different are included.

First Embodiment

Figure 1:
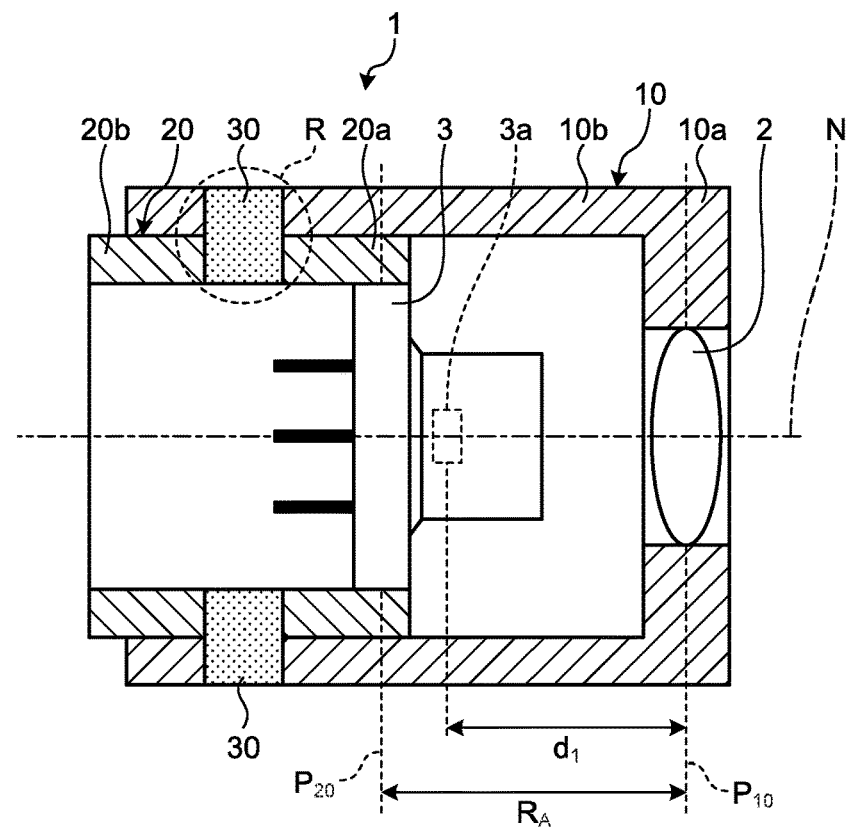
FIG. 1 is a cross-sectional view schematically illustrating the configuration of an optical unit according to a first embodiment.

FIG. 1 is a partial cross-sectional view schematically illustrating the configuration of an optical unit according to a first embodiment, and is a partial cross-sectional view with a plane including the optical axis of the optical unit as a cutting plane. An optical unit 1 illustrated in the diagram includes a lens 2 that is a first optical device, an approximately tubular lens holder 10 for holding the lens 2, a semiconductor laser 3 that is a second optical device having a light source 3a for emitting laser light according to an input electric signal, and a tubular laser holder 20 for holding the semiconductor laser 3. In FIG. 1, explanation will be given on the assumption that the central axis of the lens holder 10 and the central axis of the laser holder 20 match each other and match the optical axis N of the optical unit 1. The optical unit 1 emits light emitted from the light source 3a to the outside through the lens 2. In the present first embodiment, the lens holder 10 corresponds to a first optical device holding body, and the laser holder 20 corresponds to a second optical device holding body.

The lens 2 is a collimating lens or a condensing lens formed by using glass or resin. In addition, in the present first embodiment, explanation will be given on the assumption that the lens holder 10 holds one lens 2, but the lens holder 10 may hold an optical device including a plurality of lenses.

The lens holder 10 has an annular first holding portion 10a for holding the lens 2 and a tubular first fitting portion 10b that extends along the direction of the optical axis N from an end portion of the first holding portion 10a in the direction of the optical axis N toward the semiconductor laser 3 and is fitted to the laser holder 20. The lens 2 is fixed to the first holding portion 10a by soldering or adhesion using an adhesive, for example. In addition, the diameter of the inner wall surface of the first fitting portion 10b is the same as the diameter of the outer periphery of the laser holder 20, but may be any diameter as long as the laser holder 20 can be fitted.

The laser holder 20 has a second holding portion 20a for holding the semiconductor laser 3 and a tubular second fitting portion 20b that extends in the direction of the optical axis N from an end portion of the second holding portion 20a in the direction of the optical axis N toward a side opposite to the lens 2 side and is fitted to the lens holder 10. The semiconductor laser 3 is fixed to the second holding portion 20a by laser welding, for example. The diameter of the outer periphery of the second holding portion 20a is equal to or slightly smaller than the diameter of the inner periphery of the lens holder 10.

It is preferable that the lens holder 10 and the laser holder 20 are formed of materials having the same degree of contraction rate when melted and solidified by laser light. As the materials, stainless steel (ferrite type, martensitic type, and austenitic type), steel materials (carbon steel for machine structure use and rolled steel for general structure), Invar material, and resin (Acrylonitrile Butadiene Styrene: ABS and Poly Ether Ether Ketone: PEEK) can be mentioned. In manufacturing the optical unit 1, in order to easily perform positional adjustment between the lens holder 10 and the laser holder 20 when fitting the lens holder 10 and the laser holder 20 together, the surface roughness of the first fitting portion 10b and the second fitting portion 20b may be reduced, or a gap may be formed in a part of a fitting portion between the first fitting portion 10b and the second fitting portion 20b using a notch or the like by which the first fitting portion 10b and the second fitting portion 20b are not in contact with each other.

In the optical unit 1, a distance $d_1$ between the lens 2 and the light source 3a of the semiconductor laser 3 is a distance satisfying the optical conditions set in advance.

In addition, the lens holder 10 and the laser holder 20 are bonded to each other by melting and solidifying a portion, in which the first fitting portion 10b and the second fitting portion 20b overlap each other in the radial direction and which is outside a region $R_A$ interposed between a holding surface $P_{10}$ of the first holding portion 10a and a holding surface $P_{20}$ of the second holding portion 20a in the direction of the optical axis N, with laser light. The "holding surface $P_{10}$" referred to herein is a plane that passes through the center of a portion, at which the first holding portion 10a is in contact with the lens 2, in the direction of the optical axis N and is perpendicular to the optical axis N. In addition, the "holding surface $P_{20}$" is a plane that passes through the center of a portion, at which the second holding portion 20a is in contact with the semiconductor laser 3, in the direction of the optical axis N and is perpendicular to the optical axis N. By this laser welding, in the lens holder 10 and the laser holder 20, a welded portion 30 is formed by mixing and curing respective molten portions. At this time, in the optical unit 1, the lens 2 and the semiconductor laser 3 are held by the lens holder 10 and the laser holder 20, respectively, on the same side with respect to the welded portion 30. That is, in the lens holder 10 and the laser holder 20, portions that hold the lens 2 and the semiconductor laser 3 and connect to the device are on the same side with respect to a plane passing through the welded portion 30 and perpendicular to the optical axis N. In addition, although the holding surface passes through the center of a portion, at which the holding portion is in contact with the optical device, in the direction of the optical axis N, design change of the passing position, such as passing through one end portion of a portion in contact with the optical device in the direction of the optical axis N, is possible.

Figure 2:
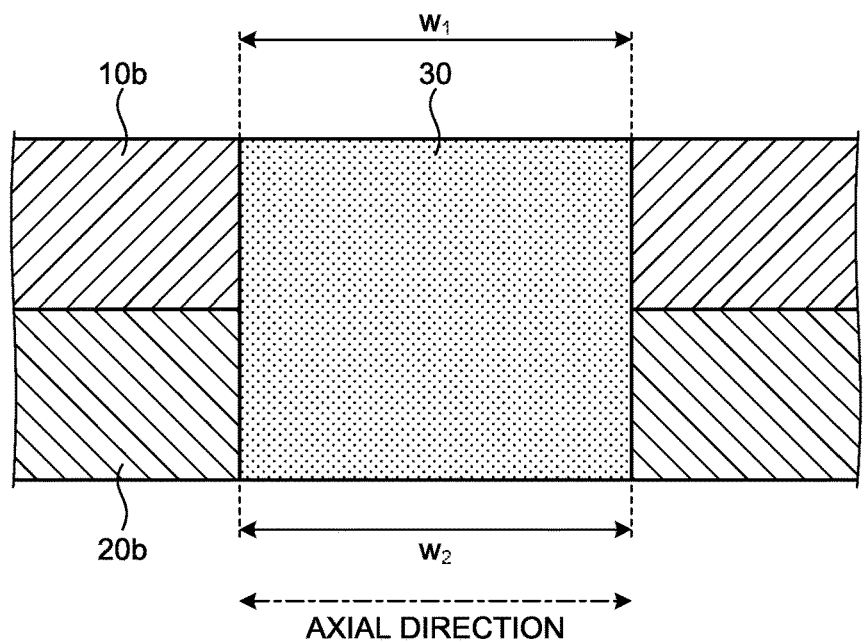
FIG. 2 is an enlarged view of a region R in FIG. 1.

FIG. 2 is an enlarged view of a region R including the welded portion 30 of the optical unit 1 illustrated in FIG. 1. As described above, the welded portion 30 that bonds the first fitting portion 10b and the second fitting portion 20b to each other are formed in a part of the first fitting portion 10b and a part of the second fitting portion 20b. Assuming that the length of each fitting portion in the radial direction perpendicular to the direction of the optical axis N is a thickness and the length of each fitting portion in the direction of the optical axis N is a width, the welding width $w_1$ of a central portion of the welded portion 30 in the thickness direction of the first fitting portion 10b and the welding width $w_2$ of a central portion of the welded portion 30 in the thickness direction of the second fitting portion 20b are approximately the same. Specifically, the fact that the welding width $w_1$ and the welding width $w_2$ are approximately the same means that the ratio ($w_2/w_1$) of the welding width $w_2$ of the laser holder 20 to the welding width $w_1$ of the lens holder 10 which is irradiated with laser light satisfies the relationship of $0.75 \leq w_2/w_1 \leq 1.25$. In this range, for example, in a case where the welding width $w_1$ is 0.4 mm, the welding width $w_2$ is 0.3 to 0.5 mm.

Figure 3:
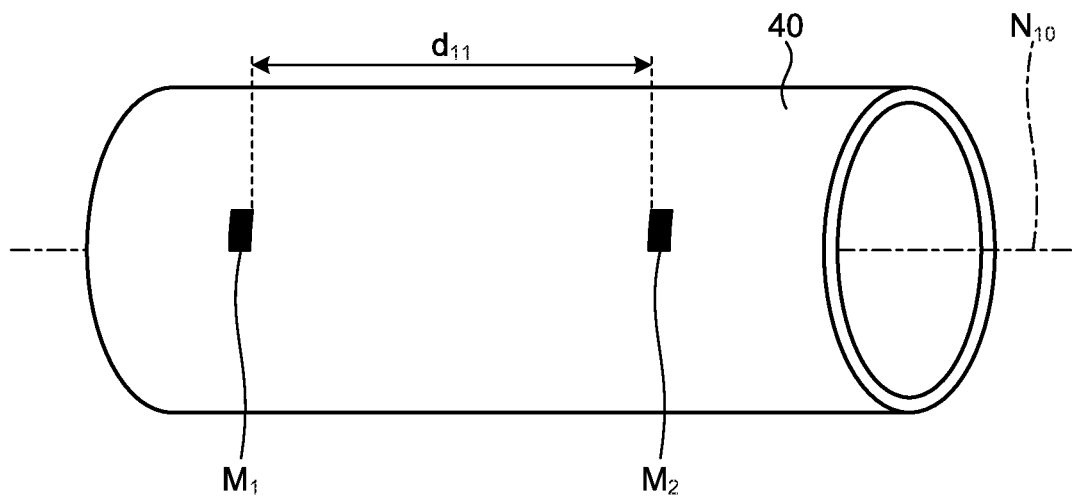
FIG. 3 is a diagram for explaining a method of measuring a dimensional change at the time of melting and solidification.
Figure 4:
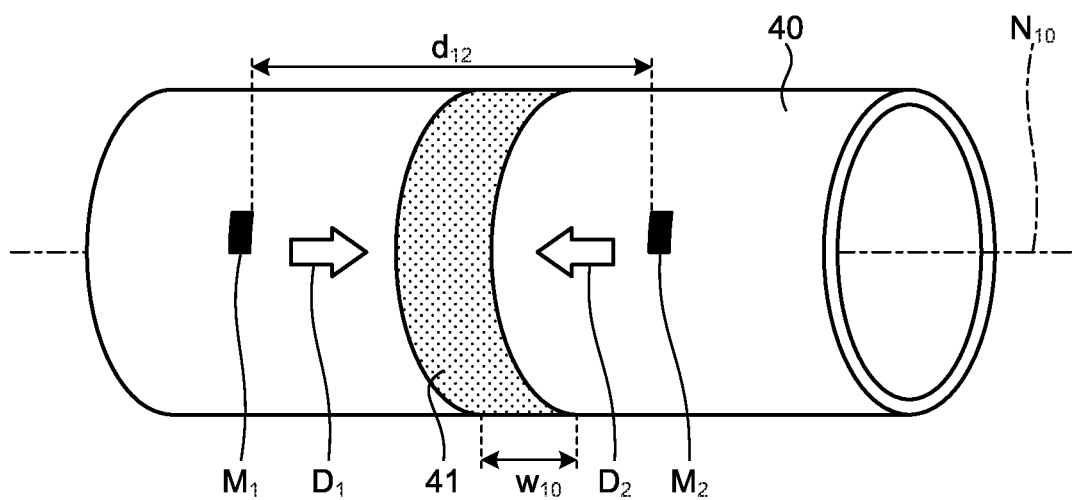
FIG. 4 is a diagram for explaining a method of measuring a dimensional change at the time of melting and solidification.

Next, contraction of a holder due to melting and solidification will be described with reference to FIGS. 3 and 4. FIGS. 3 and 4 are diagrams for explaining a method of measuring a dimensional change at the time of melting and solidification.

First, two markers $M_1$ and $M_2$ are given to the outer surface of a tubular member for measurement (hereinafter, referred to as a measurement member) 40 (refer to FIG. 3). The markers $M_1$ and $M_2$ may be ink-based or sealant-based. It is preferable that the markers $M_1$ and $M_2$ are provided along the direction of an optical axis $N_{10}$ of the measurement member 40.

Thereafter, a distance $d_{11}$ between the markers $M_1$ and $M_2$ is measured. The distance $d_{11}$ is a distance between the markers $M_1$ and $M_2$ in the direction of the optical axis $N_{10}$.

After measuring the distance $d_{11}$ between the markers $M_1$ and $M_2$ before melting and solidification, a part between the markers $M_1$ and $M_2$ is irradiated with laser light to melt and solidify a part of the measurement member 40. At this time, as illustrated in FIG. 4, the entire circumference of the measurement member 40 is irradiated with laser light. For example, laser light is irradiated while the measurement member 40 is rotated with the optical axis $N_{10}$ as a rotation axis or a laser head which emits the laser light is rotated along the outer periphery of the measurement member 40. As a result, in the measurement member 40, a welded portion 41 is formed around the optical axis $N_{10}$. Due to the formation of the welded portion 41, the measurement member 40 contracts in a direction (arrows $D_1$ and $D_2$ in FIG. 4) in which both end portions approach each other with the welded portion 41 as a boundary.

After forming the welded portion 41 in the measurement member 40, a distance $d_{12}$ between the markers $M_1$ and $M_2$ is measured. The distance $d_{12}$ becomes smaller than the distance $d_{11}$ described above due to contraction of the measurement member 40 due to melting and solidification. A difference between the distance $d_{11}$ and the distance $d_{12}$ is calculated as a dimensional change amount (contraction amount). Thereafter, the intensity of the laser light is changed to form the welding width $w_{10}$ as described above and measure the dimensional change amount due to contraction. By changing the intensity of the laser light, dimensional change amounts at different welding widths can be obtained.

Figure 5:
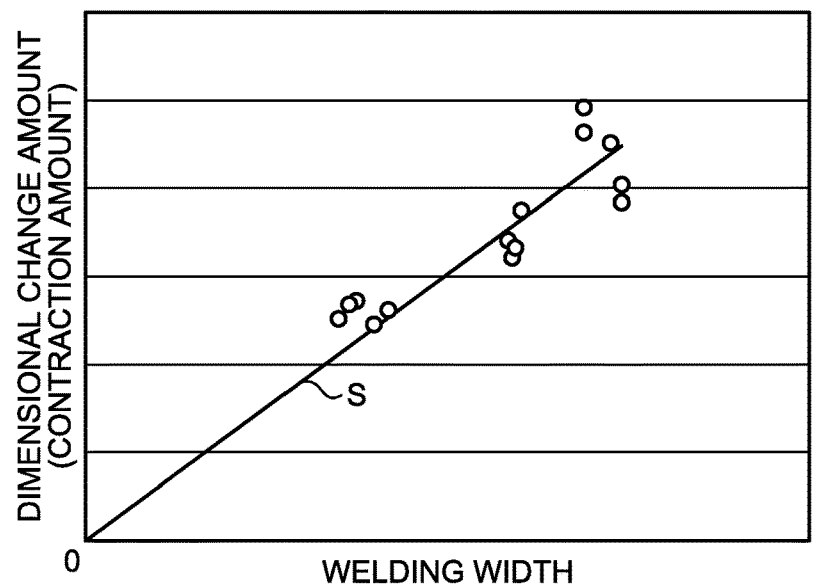
FIG. 5 is a diagram for explaining an example of the measurement result of a dimensional change at the time of melting and solidification.

FIG. 5 is a diagram for explaining an example of the measurement result of a dimensional change at the time of melting and solidification, and is a diagram illustrating the relationship between the welding width and the dimensional change amount. As illustrated in FIG. 5, the welding width and the dimensional change amount are approximately proportional to each other (refer to an approximate straight line S in FIG. 5). Therefore, it can be easily predicted that a change in the positional relationship between the lens 2 and the semiconductor laser 3 before melting and solidification increases as the difference between the welding width in the lens holder 10 and the welding width in the laser holder 20 increases in the welded portion 30.

Figure 6:
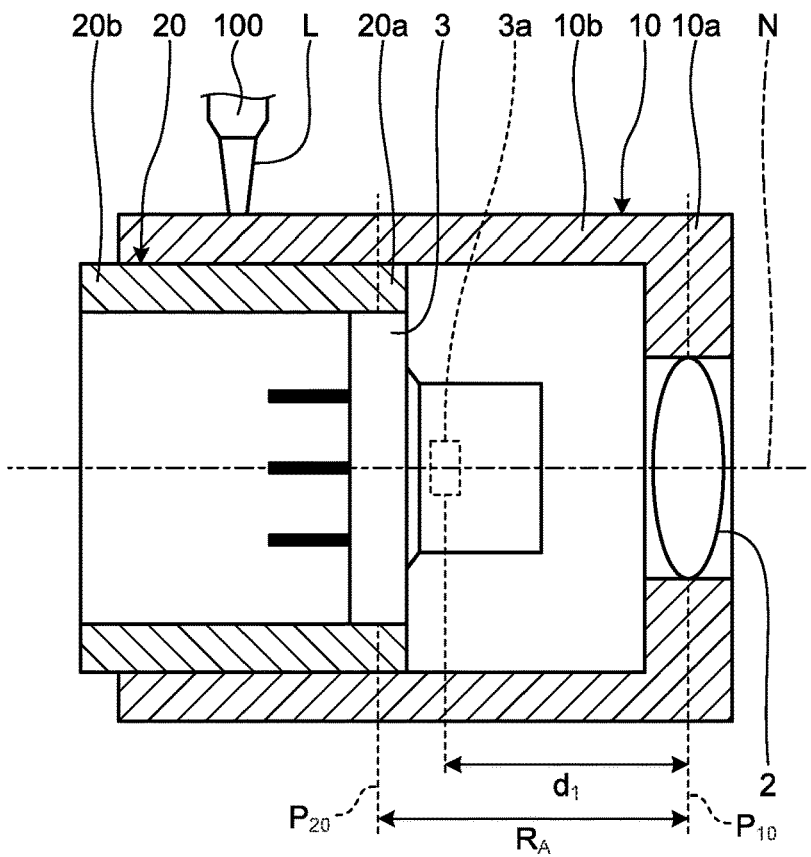
FIG. 6 is a schematic diagram for explaining the manufacturing of the optical unit according to the first embodiment.

Next, a method of manufacturing the above-described optical unit 1 will be described with reference to FIG. 6. FIG. 6 is a schematic diagram for explaining the manufacturing of the optical unit 1 according to the first embodiment.

First, the laser holder 20 is inserted and fitted into the first fitting portion 10b from the second holding portion 20a side. Thereafter, the optical path length between the lens 2 and the semiconductor laser 3 is adjusted by moving the laser holder 20 relative to the lens holder 10 so that the distance $d_1$ between the lens 2 and the light source 3a is a distance satisfying the optical conditions.

Thereafter, a part of the lens holder 10 and a part of the laser holder 20 are melted and solidified by arranging a laser head 100 and irradiating the outer surface of the lens holder 10 with laser light L. The emission position of the laser light L at this time is a position where the first fitting portion 10b and the second fitting portion 20b overlap each other in the radial direction, and is located outside the region $R_A$ in the direction of the optical axis N. In addition, the lens holder 10 and the laser holder 20 are melted and solidified so as to have a uniform welding width from the lens holder 10 to the laser holder 20 by the intensity distribution of the laser light L or the movement of the laser head 100. At this time, the laser light may be intermittently irradiated by pulsed light or may be continuously irradiated. In a case where the laser light is intermittently irradiated, the welded portion 30 may be a welded portion in which weld bead are intermittently formed along the circumferential direction of the holder, or may be a welded portion in which weld bead are continuously connected over the entire circumference in the circumferential direction. In addition, in a case where the laser light is continuously irradiated, the welded portion 30 is configured to include one weld bead extending in the circumferential direction.

Figure 7:
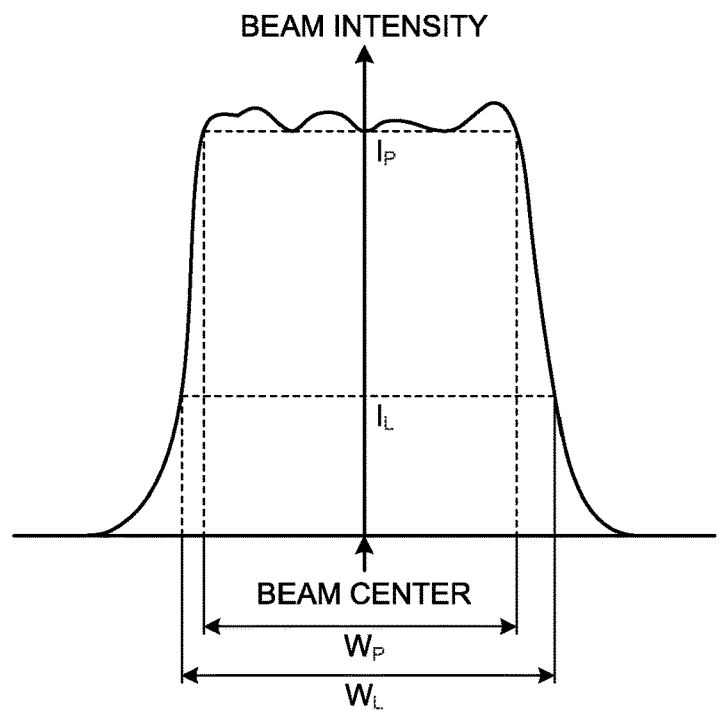
FIG. 7 is a diagram for explaining the characteristics of laser light used when performing laser welding.

FIG. 7 is a diagram for explaining the characteristics of laser light used when performing laser welding. FIG. 7 is a diagram illustrating the distribution of the beam intensity in a cross section passing through the beam waist of the laser light. As illustrated in FIG. 7, in the present first embodiment, laser welding is performed using laser light with a top hat type intensity distribution in which the value of a beam diameter $W_L$ at a lower limit intensity $I_L$ at which a holder can be melted is approximately the same as the value of a beam diameter $W_P$ at a peak intensity $I_P$ and the beam intensity sharply rises from the edge of the beam toward the center and reaches the peak intensity $I_P$. As a result, the holder is irradiated with laser light having approximately uniform accumulated energy per unit area of an irradiation region. In addition, for example, by making laser light having a generally known Gaussian type intensity distribution pass through an optical system that performs beam intensity distribution conversion, the laser light may be irradiated after conversion into a top hat type intensity distribution in which the beam diameter $W_L$ and the beam diameter $W_P$ are approximately the same and the beam intensity sharply rises from the edge of the beam cross section toward the inside.

In the first embodiment described above, the welded portion 30 in which the welding width $w_1$ in the lens holder 10 and the welding width $w_2$ in the laser holder 20 are approximately the same is formed in a portion in which the first fitting portion 10b and the second fitting portions 20b overlap each other and which is outside the region $R_A$ interposed between the holding surface $P_{10}$ of the first holding portion 10a and the holding surface $P_{20}$ of the second holding portion 20a, so that the lens holder 10 and the laser holder 20 are bonded to each other. Therefore, when laser welding is performed, each holder contracts with the same contraction amount, and the lens 2 and the semiconductor laser 3 move to the same side due to contraction. As a result, even if contraction occurs due to melting and solidification, it is possible to weld the lens holder 10 and the laser holder 20 together while suppressing the relative positional shift between the optical devices held by the respective holders. As described above, according to the present first embodiment, even in a case where holders are bonded to each other by welding, it is possible to obtain an optical unit having desired optical characteristics.

Figure 8:
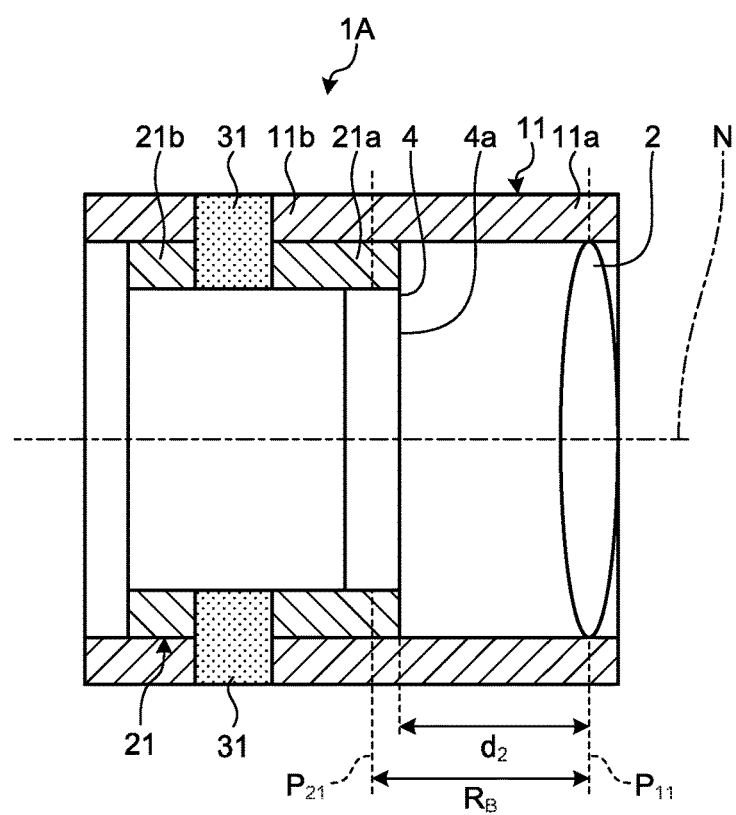
FIG. 8 is a cross-sectional view schematically illustrating the configuration of an optical unit according to a modification example of the first embodiment.

Modification example of the first embodiment FIG. 8 is a cross-sectional view schematically illustrating the configuration of an optical unit according to a modification example of the first embodiment. FIG. 8 is a partial cross-sectional view with a plane including the center axis of the optical unit as a cutting plane. In the first embodiment described above, the second optical device has been described as the semiconductor laser 3. However, in this modification example, an image sensor 4 is used as the second optical device. An optical unit 1A according to this modification example is provided in an endoscope including an insertion portion to be inserted into a subject, for example.

The optical unit 1A illustrated in the diagram includes a lens 2 that is a first optical device, an approximately tubular lens holder 11 for holding the lens 2, the image sensor 4 that is a second optical device that has a light receiving surface 4a for receiving light from the outside and converts the received light into an electric signal, and a tubular sensor holder 21 for holding the image sensor 4. In FIG. 8, explanation will be given on the assumption that the central axis of the lens holder 11 and the central axis of the sensor holder 21 match each other and match the optical axis N of the optical unit 1A. The lens 2 is a lens for focusing light from the outside on the light receiving surface 4a. In this modification example, the lens holder 11 corresponds to a first optical device holding body, and the sensor holder 21 corresponds to a second optical device holding body.

In the lens holder 11, the diameter of the inner wall surface, that is, a diameter in a direction perpendicular to the optical axis N, is approximately the same as the diameter of the outer periphery of the sensor holder 21. The lens holder 11 has an annular first holding portion 11a for holding the lens 2 and a tubular first fitting portion 11b that extends in the direction of the optical axis N from an end portion of the first holding portion 11a in the direction of the optical axis N toward the image sensor 4 and is fitted to the sensor holder 21. The lens 2 is fixed to the first holding portion 11a by soldering or adhesion using an adhesive, for example. In addition, the diameter of the inner wall surface of the lens holder 11 is the same as the diameter of the outer periphery of the sensor holder 21, but may be any diameter as long as the sensor holder 21 can be fitted.

The sensor holder 21 has a second holding portion 21a for holding the image sensor 4 and a tubular second fitting portion 21b that extends in the direction of the optical axis N from an end portion of the second holding portion 21a in the direction of the optical axis N toward a side opposite to the lens 2 side and is fitted to the lens holder 11. The image sensor 4 is fixed to the second holding portion 21a by laser welding, for example. The diameter of the outer periphery of the sensor holder 21 is equal to or slightly smaller than the diameter of the inner periphery of the lens holder 11.

The image sensor 4 is realized by using, for example, a Charge Coupled Device (CCD) image sensor or a Complementary Metal Oxide Semiconductor (CMOS) image sensor. The image sensor 4 photoelectrically converts the received observation light to generate an electric signal.

In the optical unit 1A, a distance $d_2$ between the lens 2 and the light receiving surface 4a of the image sensor 4 is a distance satisfying the optical conditions set in advance.

In addition, the lens holder 11 and the sensor holder 21 are bonded to each other by melting and solidifying a portion, in which the first fitting portion 11b and the second fitting portion 21b overlap each other in the radial direction and which is outside a region $R_B$ interposed between a holding surface $P_{11}$ of the first holding portion 11a and a holding surface $P_{21}$ of the second holding portion 21a in the direction of the optical axis N, with laser light. The "holding surface $P_{11}$" referred to herein is a plane that passes through the center of a portion, at which the first holding portion 11a is in contact with the lens 2, in the direction of the optical axis N and is perpendicular to the optical axis N. In addition, the "holding surface $P_{21}$" is a plane that passes through the center of a portion, at which the second holding portion 21a is in contact with the image sensor 4, in the direction of the optical axis N and is perpendicular to the optical axis N. By this laser welding, in the lens holder 11 and the sensor holder 21, a welded portion 31 is formed by mixing and curing respective molten portions. In addition, in the optical unit 1A, the lens 2 and the image sensor 4 are held by the lens holder 11 and the sensor holder 21, respectively, on the same side with respect to the welded portion 31. In the welded portion 31, similarly to the welded portion 30 described above, the welding width of a central portion in the thickness direction of the lens holder 11 and the welding width of a central portion in the thickness direction of the sensor holder 21 are almost the same.

The optical unit 1A is manufactured in the same manner as in the optical unit 1 described above. Specifically, the sensor holder 21 is inserted and fitted into the first fitting portion 11b from the second holding portion 21a side. At this time, the optical path length between the lens 2 and the image sensor 4 is adjusted by moving the sensor holder 21 relative to the lens holder 11 so that the distance $d_2$ between the lens 2 and the light receiving surface 4a is a distance satisfying the optical conditions. Thereafter, a part of the first fitting portion 11b and a part of the second fitting portion 21b are melted and solidified by irradiating the above-described position on the outer surface of the lens holder 11 with laser light.

In the modification example of the first embodiment described above, in the same manner as in the first embodiment, the welded portion 31 in which the welding width in the lens holder 11 and the welding width in the sensor holder 21 are approximately the same is formed in a portion in which the first fitting portion 11b and the second fitting portions 21b overlap each other and which is outside the region $R_B$ interposed between the holding surface $P_{11}$ of the first holding portion 11a and the holding surface $P_{21}$ of the second holding portion 21a, so that the lens holder 11 and the sensor holder 21 are bonded to each other. Therefore, when laser welding is performed, the contraction amount of the lens holder 11 and the contraction amount of the sensor holder 21 become the same and the movement directions of the optical devices held by the respective holders become the same. As a result, even if contraction occurs due to melting and solidification, it is possible to weld the lens holder 11 and the sensor holder 21 together while suppressing the relative positional shift between the optical devices held by the respective holders. As described above, according to the modification example of the present first embodiment, even in a case where holders are bonded to each other by welding, it is possible to obtain an optical unit having desired optical characteristics.

In the modification example described above, the second optical device has been described as an image sensor. However, in addition to the image sensor, the second optical device may include an electronic component that is provided separately from the image sensor and processes the electric signal acquired by the image sensor, such as a Digital Signal Processor (DSP) that performs compression and filtering.

Second Embodiment

Figure 9:
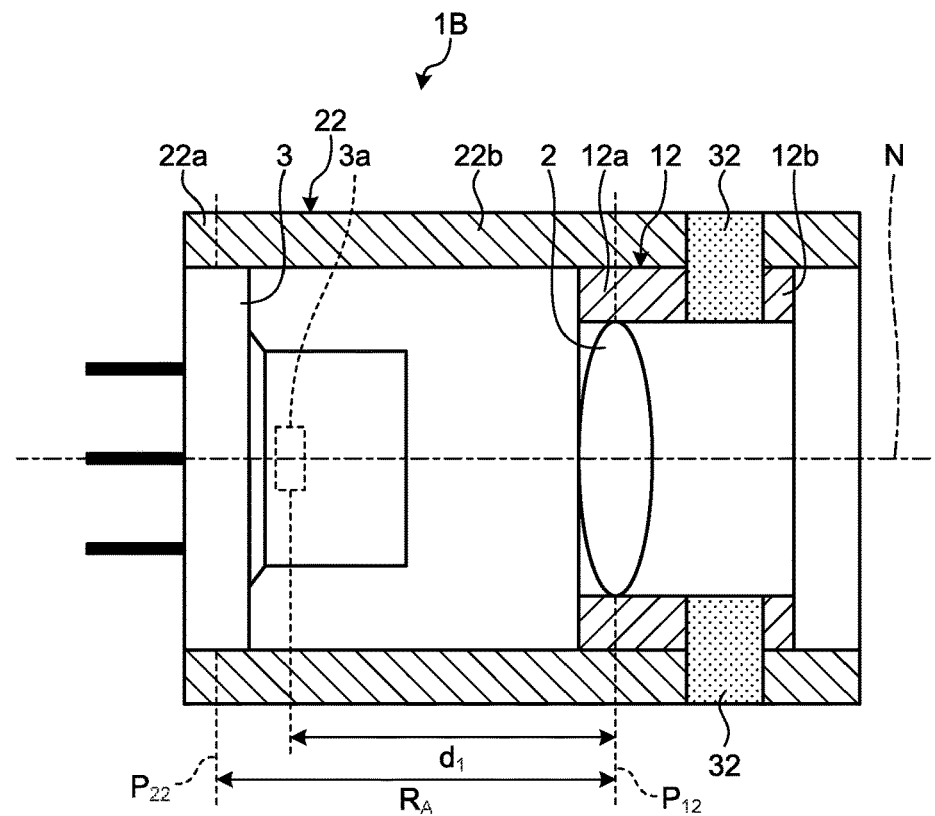
FIG. 9 is a cross-sectional view schematically illustrating the configuration of an optical unit according to a second embodiment.

FIG. 9 is a cross-sectional view schematically illustrating the configuration of an optical unit according to a second embodiment. FIG. 9 is a partial cross-sectional view with a plane including the center axis of the optical unit as a cutting plane. In the above-described first embodiment, the configuration in which the laser holder 20 is housed in the lens holder 10 has been described. However, in the second embodiment, a lens holder 12 is housed in a laser holder 22.

An optical unit 1B illustrated in the diagram includes a lens 2 that is a first optical device, the approximately tubular lens holder 12 for holding the lens 2, the above-described semiconductor laser 3, and the tubular laser holder 22 for holding the semiconductor laser 3. In FIG. 9, explanation will be given on the assumption that the central axis of the lens holder 12 and the central axis of the laser holder 22 match each other and match the optical axis N of the optical unit 1B. In the present second embodiment, the lens holder 12 corresponds to a first optical device holding body, and the laser holder 22 corresponds to a second optical device holding body.

The lens holder 12 has an annular first holding portion 12a for holding the lens 2 and a tubular first fitting portion 12b that extends in the direction of the optical axis N from an end portion of the first holding portion 12a in the direction of the optical axis N toward a side opposite to the semiconductor laser 3 side and is fitted to the laser holder 22. The lens 2 is fixed to the first holding portion 12a by soldering or adhesion using an adhesive, for example.

In the laser holder 22, the diameter of the inner wall surface, that is, a diameter in a direction perpendicular to the optical axis N, is the same as the diameter of the outer periphery of the lens holder 12. The laser holder 22 has a second holding portion 22a for holding the semiconductor laser 3 and a tubular second fitting portion 22b that extends in the direction of the optical axis N from an end portion of the second holding portion 22a in the direction of the optical axis N toward the lens 2 and is fitted to the lens holder 12. The semiconductor laser 3 is fixed to the second holding portion 22a by laser welding, for example. In addition, the diameter of the inner wall surface of the second fitting portion 22b is the same as the diameter of the outer periphery of the lens holder 12, but may be any diameter as long as the first fitting portion 12b can be fitted.

In the optical unit 1B, a distance $d_1$ between the lens 2 and the light source 3a of the semiconductor laser 3 is a distance satisfying the optical conditions set in advance.

In addition, the lens holder 12 and the laser holder 22 are bonded to each other by melting and solidifying a portion, in which the first fitting portion 12b and the second fitting portion 22b overlap each other in the radial direction and which is on the outer side in the direction of the optical axis N of a region $R_A$ interposed between a holding surface $P_{12}$ of the first holding portion 12a and a holding surface $P_{22}$ of the second holding portion 22a in the direction of the optical axis N, with laser light. The "holding surface $P_{12}$" referred to herein is a plane that passes through the center of a portion, at which the first holding portion 12a is in contact with the lens 2, in the direction of the optical axis N and is perpendicular to the optical axis N. In addition, the "holding surface $P_{22}$" is a plane that passes through the center of a portion, at which the second holding portion 22a is in contact with the semiconductor laser 3, in the direction of the optical axis N and is perpendicular to the optical axis N. By this laser welding, in the lens holder 12 and the laser holder 22, a welded portion 32 is formed by mixing and curing respective molten portions. In addition, in the optical unit 1B, the lens 2 and the semiconductor laser 3 are held by the lens holder 12 and the laser holder 22, respectively, on the same side with respect to the welded portion 32.

The optical unit 1B is manufactured in the same manner as in the optical unit 1 described above. Specifically, the lens holder 12 is inserted and fitted into the second fitting portion 22b from the first holding portion 12a side. At this time, the optical path length between the lens 2 and the semiconductor laser 3 is adjusted by moving the lens holder 12 relative to the laser holder 22 so that the distance $d_1$ between the lens 2 and the light source 3a is a distance satisfying the optical conditions. Thereafter, a part of the lens holder 12 and a part of the laser holder 22 are melted and solidified by irradiating the above-described position on the outer surface of the laser holder 22 with laser light. In the present second embodiment, in order to prevent a molten part of the holder from adhering to the lens 2, it is preferable to inject the cooling gas into the lens holder 12 to forcibly solidify the molten portion on the inner side of the lens holder 12 or to use a protective member such as a cover for protecting the lens 2.

In the second embodiment described above, in the same manner as in the first embodiment, the welded portion 32 in which the welding width in the lens holder 12 and the welding width in the laser holder 22 are approximately the same is formed in a portion in which the first fitting portion 12b and the second fitting portions 22b overlap each other and which is outside the region $R_A$ interposed between the holding surface $P_{12}$ of the first holding portion 12a and the holding surface $P_{22}$ of the second holding portion 22a, so that the lens holder 12 and the laser holder 22 are bonded to each other. Therefore, when laser welding is performed, the contraction amount of the lens holder 12 and the contraction amount of the laser holder 22 become the same and the movement directions of the optical devices held by the respective holders become the same. As a result, even if contraction occurs due to melting and solidification, it is possible to fix the lens holder 12 and the laser holder 22 together while suppressing the relative positional shift between the optical devices held by the respective holders. As described above, according to the present second embodiment, even in a case where holders are bonded to each other by welding, it is possible to obtain an optical unit having desired optical characteristics.

Modification Example of the Second Embodiment

Figure 10:
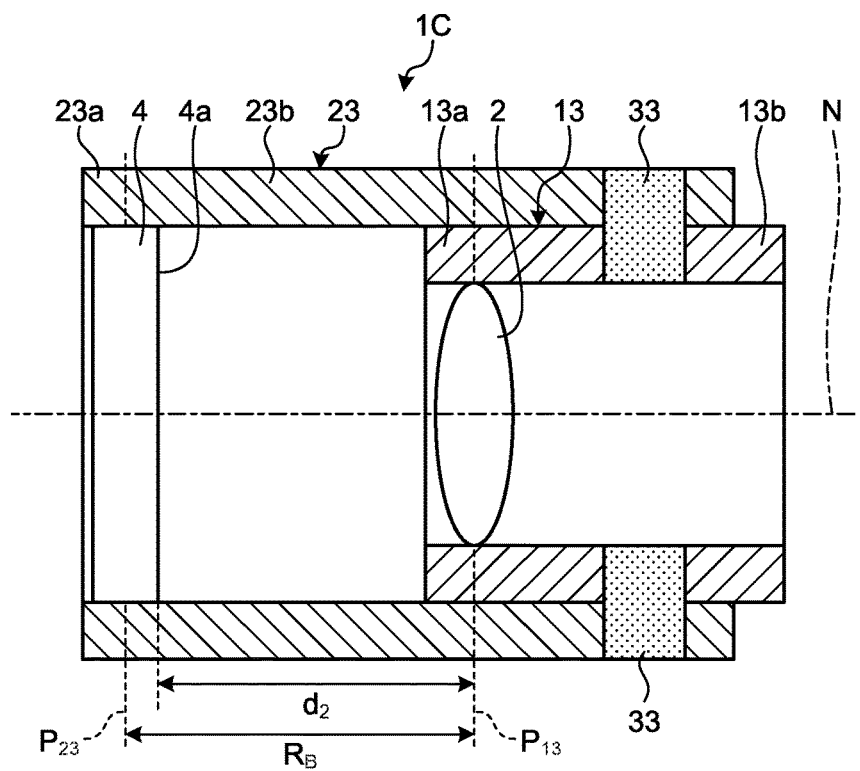
FIG. 10 is a cross-sectional view schematically illustrating the configuration of an optical unit according to a modification example of the second embodiment.

FIG. 10 is a cross-sectional view schematically illustrating the configuration of an optical unit according to a modification example of the second embodiment. FIG. 10 is a partial cross-sectional view with a plane including the center axis of the optical unit as a cutting plane. In the second embodiment described above, the second optical device has been described as the semiconductor laser 3. However, in this modification example, the second optical device is an image sensor 4.

An optical unit 10 illustrated in the diagram includes a lens 2 that is a first optical device, an approximately tubular lens holder 13 for holding the lens 2, the above-described image sensor 4, and a tubular sensor holder 23 for holding the image sensor 4. In FIG. 10, explanation will be given on the assumption that the central axis of the lens holder 13 and the central axis of the sensor holder 23 match each other and match the optical axis N of the optical unit 10. In this modification example, the lens holder 13 corresponds to a first optical device holding body, and the sensor holder 23 corresponds to a second optical device holding body.

The lens holder 13 has an annular first holding portion 13a for holding the lens 2 and a tubular first fitting portion 13b that extends in the direction of the optical axis N from an end portion of the first holding portion 13a in the direction of the optical axis N toward a side opposite to the image sensor 4 side and is fitted to the sensor holder 23. The lens 2 is fixed to the first holding portion 13a by soldering or adhesion using an adhesive, for example.

In the sensor holder 23, the diameter of the inner wall surface, that is, a diameter in a direction perpendicular to the optical axis N, is the same as the diameter of the outer periphery of the lens holder 13. The sensor holder 23 has a second holding portion 23a for holding the image sensor 4 and a tubular second fitting portion 23b that extends in the direction of the optical axis N from an end portion of the second holding portion 23a in the direction of the optical axis N toward the lens 2 and is fitted to the lens holder 13. The image sensor 4 is fixed to the second holding portion 23a by laser welding, for example. In addition, the diameter of the inner wall surface of the second fitting portion 23b is the same as the diameter of the outer periphery of the lens holder 13, but may be any diameter as long as the first fitting portion 13b can be fitted.

In the optical unit 10, a distance $d_2$ between the lens 2 and the light receiving surface 4a of the image sensor 4 is a distance satisfying the optical conditions set in advance.

In addition, the lens holder 13 and the sensor holder 23 are bonded to each other by melting and solidifying a portion, in which the first fitting portion 13b and the second fitting portion 23b overlap each other in the radial direction and which is on the outer side in the direction of the optical axis N of a region $R_B$ interposed between a holding surface $P_{13}$ of the first holding portion 13a and a holding surface $P_{23}$ of the second holding portion 23a in the direction of the optical axis N, with laser light. The "holding surface $P_{13}$" referred to herein is a plane that passes through the center of a portion, at which the first holding portion 13a is in contact with the lens 2, in the direction of the optical axis N and is perpendicular to the optical axis N. In addition, the "holding surface $P_{23}$" is a plane that passes through the center of a portion, at which the second holding portion 23a is in contact with the image sensor 4, in the direction of the optical axis N and is perpendicular to the optical axis N. By this laser welding, in the lens holder 13 and the sensor holder 23, a welded portion 33 is formed by mixing and curing respective molten portions. In addition, in the optical unit 10, the lens 2 and the image sensor 4 are held by the lens holder 13 and the sensor holder 23, respectively, on the same side with respect to the welded portion 33. In the welded portion 33, similarly to the welded portion 32 described above, the welding width of a central portion in the thickness direction of the lens holder 13 and the welding width of a central portion in the thickness direction of the sensor holder 23 are almost the same.

The optical unit 10 is manufactured in the same manner as in the optical unit 1B described above. Specifically, the lens holder 13 is inserted into the second fitting portion 23b from the first holding portion 13a side. At this time, the position of the lens holder 13 with respect to the sensor holder 23 is adjusted so that the distance $d_2$ between the lens 2 and the light receiving surface 4a is a distance satisfying the optical conditions. Thereafter, a part of the lens holder 13 and a part of the sensor holder 23 are melted and solidified by irradiating the above-described position on the outer surface of the sensor holder 23 with laser light.

In the modification example of the second embodiment described above, in the same manner as in the second embodiment, the welded portion 33 in which the welding width in the lens holder 13 and the welding width in the sensor holder 23 are approximately the same is formed in a portion in which the first fitting portion 13b and the second fitting portions 23b overlap each other and which is outside the region $R_B$ interposed between the holding surface $P_{13}$ of the first holding portion 13a and the holding surface $P_{23}$ of the second holding portion 23a, so that the lens holder 13 and the sensor holder 23 are bonded to each other. Therefore, when laser welding is performed, the contraction amount and the movement direction of the lens holder 13 become the same as those of the sensor holder 23. As a result, even if contraction occurs due to melting and solidification, it is possible to weld the lens holder 13 and the sensor holder 23 together while suppressing the relative positional shift between the optical devices held by the respective holders. As described above, according to the modification example of the present second embodiment, even in a case where holders are bonded to each other by welding, it is possible to obtain an optical unit having desired optical characteristics.

Third Embodiment

Figure 11:
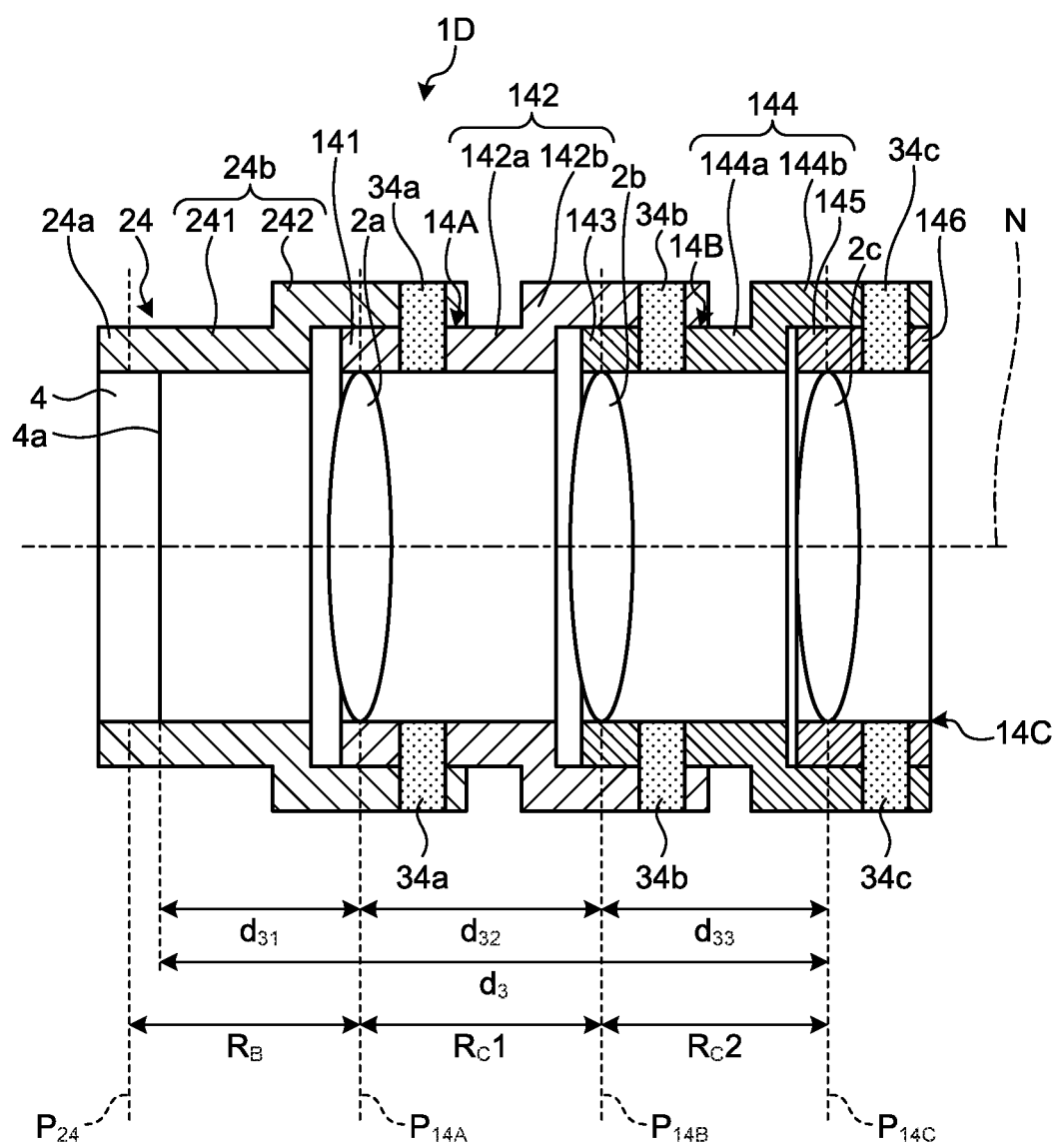
FIG. 11 is a cross-sectional view schematically illustrating the configuration of an optical unit according to a third embodiment.

FIG. 11 is a cross-sectional view schematically illustrating the configuration of an optical unit according to a third embodiment. FIG. 11 is a partial cross-sectional view with a plane including the center axis of the optical unit as a cutting plane. In the present third embodiment, an optical unit includes three lens holders.

An optical unit 1D illustrated in the diagram includes three lenses (lenses 2a, 2b, and 2c) that are first optical devices, three approximately tubular lens holders (a first lens holder 14A, a second lens holder 14B, and a third lens holder 14C) for holding the respective lenses, the above-described image sensor 4, and a tubular sensor holder 24 for holding the image sensor 4. In FIG. 11, explanation will be given on the assumption that the central axes of the first lens holder 14A, the second lens holder 14B, and the third lens holder 14C and the central axis of the sensor holder 24 match each other and match the optical axis N of the optical unit 1D. In the present third embodiment, in the first lens holder 14A, the second lens holder 14B, and the third lens holder 14C and the sensor holder 24, one of the holders to be bonded is a first optical device holding body and the other is a second optical device holding body.

The first lens holder 14A has a shape in which the diameter of the outer periphery and the diameter of the inner periphery change stepwise along the axial direction. Specifically, the first lens holder 14A has an annular first holding portion 141 for holding the lens 2a and a first fitting portion 142 that extends in the direction of the optical axis N from an end portion of the first holding portion 141 in the direction of the optical axis N toward the lens 2b and that is fitted to the sensor holder 24 at one end and fitted to the second lens holder 14B at the other end. The first holding portion 141 and the first fitting portion 142 have approximately the same thickness. The first fitting portion 142 is connected to the first holding portion 141, and has a tubular first main body portion 142a having a diameter of the outer periphery that is approximately the same as the diameter of the outer periphery of the first holding portion 141 and a second main body portion 142b having a diameter of the outer periphery that is larger than the diameter of the outer periphery of the first main body portion 142a. The lens 2a is fixed to the first holding portion 141 by soldering or adhesion using an adhesive, for example.

The second lens holder 14B has a stepped shape along the axial direction. Specifically, the second lens holder 14B has an annular first holding portion 143 for holding the lens 2b and a first fitting portion 144 that extends in the direction of the optical axis N from an end portion of the first holding portion 143 in the direction of the optical axis N toward the lens 2c and that is fitted to the first lens holder 14A at one end and fitted to the third lens holder 14C at the other end. The first holding portion 143 and the first fitting portion 144 have approximately the same thickness. The first fitting portion 144 is connected to the first holding portion 143, and has a tubular first main body portion 144a having a diameter of the outer periphery that is approximately the same as the diameter of the outer periphery of the first holding portion 143 and a second main body portion 144b having a diameter of the outer periphery that is larger than the diameter of the outer periphery of the first main body portion 144a. The lens 2b is fixed to the first holding portion 143 by soldering or adhesion using an adhesive, for example.

The third lens holder 14C has a first holding portion 145 for holding the lens 2c and a tubular first fitting portion 146 that extends in the direction of the optical axis N from an end portion of the first holding portion 145 in the direction of the optical axis N toward a side opposite to the lens 2b side and is fitted to the second lens holder 14B. The first holding portion 145 and the first fitting portion 146 have approximately the same thickness. The diameter of the outer periphery of the third lens holder 14C is almost the same as the diameter of the inner periphery of the second main body portion 144b, and may be any diameter as long as the third lens holder 14C can be fitted into the second main body portion 144b. The lens 2c is fixed to the first holding portion 145 by soldering or adhesion using an adhesive, for example.

The sensor holder 24 has a stepped shape along the axial direction. Specifically, the sensor holder 24 has an annular second holding portion 24a for holding the image sensor 4 and a second fitting portion 24b that extends in the direction of the optical axis N from an end portion of the second holding portion 24a in the direction of the optical axis N toward the lens 2a and is fitted to the first lens holder 14A. The second holding portion 24a and the second fitting portion 24b have approximately the same thickness. The second fitting portion 24b is connected to the second holding portion 24a, and has a tubular first main body portion 241 having an aperture diameter that is the same as the aperture diameter of the second holding portion 24a and a second main body portion 242 having an aperture diameter that is larger than the aperture diameter of the first main body portion 241. The image sensor 4 is fixed to the second holding portion 24a by laser welding, for example.

In the optical unit 1D, the first main body portion 142a of the first lens holder 14A is fixed in a state in which the first main body portion 142a is inserted in the second main body portion 242 of the sensor holder 24. In addition, in the optical unit 1D, the relative positions of the first lens holder 14A and the sensor holder 24 are adjusted so that a distance $d_{31}$ between the lens 2a and the light receiving surface 4a of the image sensor 4 is a distance satisfying the optical conditions set in advance. The first lens holder 14A and the sensor holder 24 are bonded to each other by melting and solidifying a portion, in which the first fitting portion 142 and the second fitting portion 24b overlap each other in the radial direction and which is outside a region $R_B$ interposed between a holding surface $P_{144}$ of the first holding portion 141 and a holding surface $P_{24}$ of the second holding portion 24a in the direction of the optical axis N, with laser light. The "holding surface $P_{144}$" referred to herein is a plane that passes through the center of a portion, at which the first holding portion 141 is in contact with the lens 2a, in the direction of the optical axis N and is perpendicular to the optical axis N. In addition, the "holding surface $P_{24}$" is a plane that passes through the center of a portion, at which the second holding portion 24a is in contact with the image sensor 4, in the direction of the optical axis N and is perpendicular to the optical axis N. By this laser welding, in the first lens holder 14A and the sensor holder 24, a welded portion 34a is formed by mixing and curing respective molten portions. In addition, the lens 2a and the image sensor 4 are held by the first lens holder 14A and the sensor holder 24, respectively, on the same side with respect to the welded portion 34a. In the welded portion 34a, similarly to the welded portion 33 described above, the welding width of a central portion in the thickness direction of the first lens holder 14A (here, the first main body portion 142a) and the welding width of a central portion in the thickness direction of the sensor holder 24 (here, the second main body portion 242) are almost the same.

In addition, in the optical unit 1D, the first main body portion 144a of the second lens holder 14B is fixed in a state in which the first main body portion 144a is inserted in the second main body portion 142b of the first lens holder 14A. In the optical unit 1D, the relative positions of the first lens holder 14A and the second lens holder 14B are adjusted so that a distance $d_{32}$ between the lens 2a and the lens 2b is a distance satisfying the optical conditions set in advance. In addition, the first lens holder 14A and the second lens holder 14B are bonded to each other by melting and solidifying a portion, in which the first fitting portion 142 and the first fitting portion 144 overlap each other in the radial direction and which is outside a region $R_C1$ interposed between a holding surface $P_{14A}$ of the first holding portion 141 and a holding surface $P_{14B}$ of the first holding portion 143 in the direction of the optical axis N, with laser light. The "holding surface $P_{14B}$" referred to herein is a plane that passes through the center of a portion, at which the first holding portion 143 is in contact with the lens 2b, in the direction of the optical axis N and is perpendicular to the optical axis N. By this laser welding, in the first lens holder 14A and the second lens holder 14B, a welded portion 34b is formed by mixing and curing respective molten portions. In addition, the lens 2a and the lens 2b are held by the first lens holder 14A and the second lens holder 14B, respectively, on the same side with respect to the welded portion 34b. In the welded portion 34b, similarly to the welded portion 34a described above, the welding width of a central portion in the thickness direction of the first lens holder 14A (here, the second main body portion 142b) and the welding width of a central portion in the thickness direction of the second lens holder 14B (here, the first main body portion 144a) are almost the same.

In addition, in the optical unit 1D, the third lens holder 14C is fixed in a state in which the third lens holder 14C is inserted in the second main body portion 144b of the second lens holder 14B. In the optical unit 1D, the relative positions of the second lens holder 14B and the third lens holder 14C are adjusted so that a distance $d_{33}$ between the lens 2b and the lens 2c is a distance satisfying the optical conditions set in advance. In addition, the second lens holder 14B and the third lens holder 14C are bonded to each other by melting and solidifying a portion, in which the first fitting portion 144 and the first fitting portion 146 overlap each other in the radial direction and which is outside a region $R_C2$ interposed between a holding surface $P_{14B}$ of the first holding portion 143 and a holding surface $P_{14C}$ of the first holding portion 145 in the direction of the optical axis N, with laser light. The "holding surface $P_{14C}$" referred to herein is a plane that passes through the center of a portion, at which the first holding portion 145 is in contact with the lens 2c, in the direction of the optical axis N and is perpendicular to the optical axis N. By this laser welding, in the second lens holder 14B and the third lens holder 14C, a welded portion 34c is formed by mixing and curing respective molten portions. In addition, the lens 2b and the lens 2c are held by the second lens holder 14B and the third lens holder 14C, respectively, on the same side with respect to the welded portion 34c. In the welded portion 34c, similarly to the welded portion 34a described above, the welding width of a central portion in the thickness direction of the second lens holder 14B (here, the second main body portion 144b) and the welding width of a central portion in the thickness direction of the third lens holder 14C (here, the first fitting portion 146) are almost the same.

Next, a method of manufacturing the above-described optical unit 1D will be described with reference to FIGS. 12 to 16. FIGS. 12 to 16 are schematic diagrams for explaining the manufacturing of the optical unit according to the third embodiment.

Figure 12:
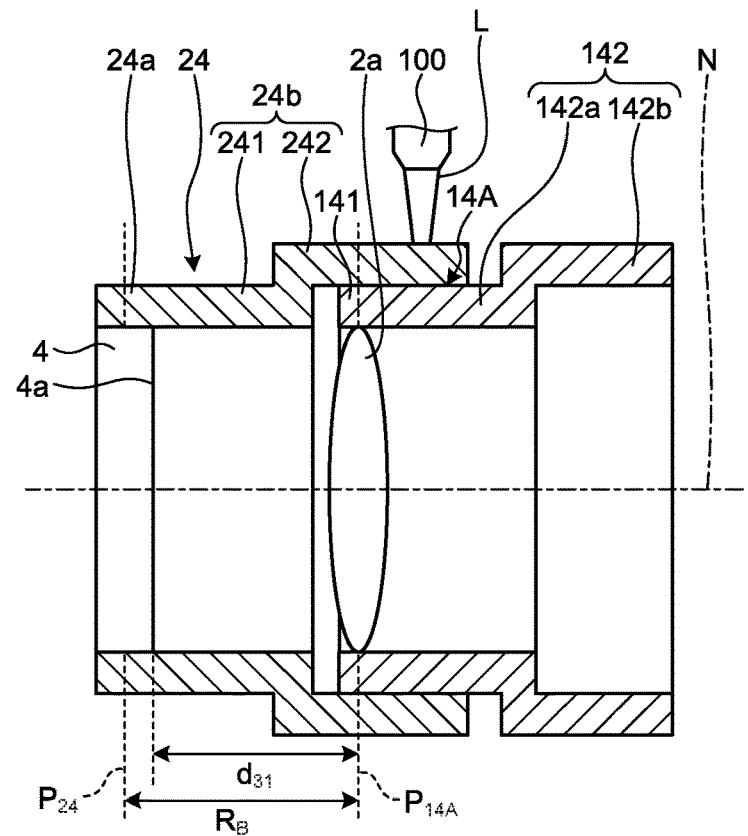
FIG. 12 is a schematic diagram for explaining the manufacturing of the optical unit according to the third embodiment.
Figure 13:
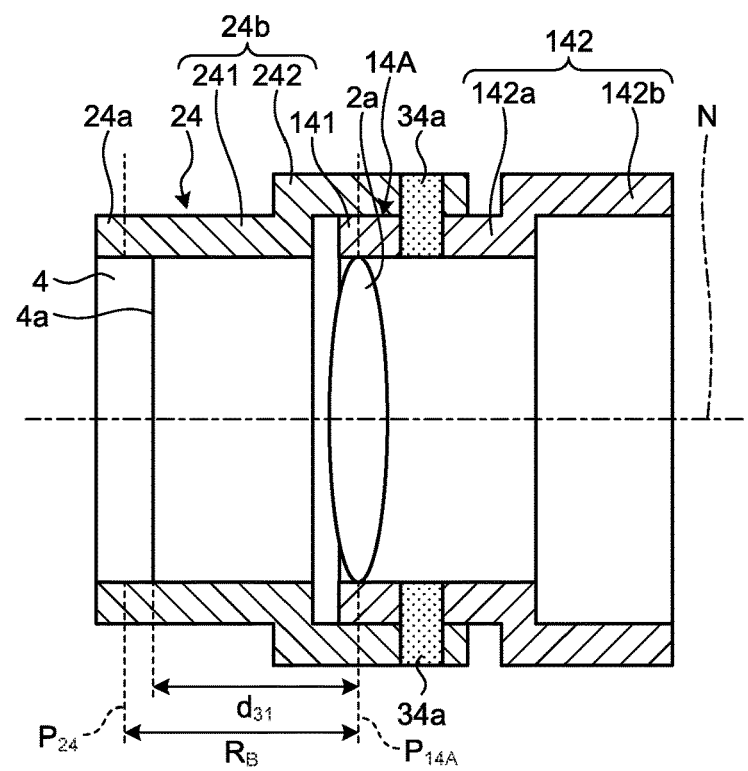
FIG. 13 is a schematic diagram for explaining the manufacturing of the optical unit according to the third embodiment.

First, the first main body portion 142a of the first lens holder 14A is inserted into the second main body portion 242 of the sensor holder 24 from the first holding portion 141 side (refer to FIG. 12). Thereafter, the position of the first lens holder 14A with respect to the sensor holder 24 is adjusted so that the distance $d_{31}$ between the lens 2a and the light receiving surface 4a is a distance satisfying the optical conditions.

Thereafter, a part of the first lens holder 14A and a part of the sensor holder 24 are melted and solidified by arranging the laser head 100 and irradiating the outer surface of the second main body portion 242 of the sensor holder 24 with the laser light L. The emission position of the laser light L at this time is a portion in which the first fitting portion 142 and the second fitting portion 24b overlap each other in the radial direction, and is located outside the region $R_B$ interposed between the holding surface $P_{14A}$ of the first holding portion 141 and the holding surface $P_{24}$ of the second holding portion 24a. As a result, the welded portion 34a is formed to bond the first lens holder 14A and the sensor holder 24 to each other (refer to FIG. 13).

Figure 14:
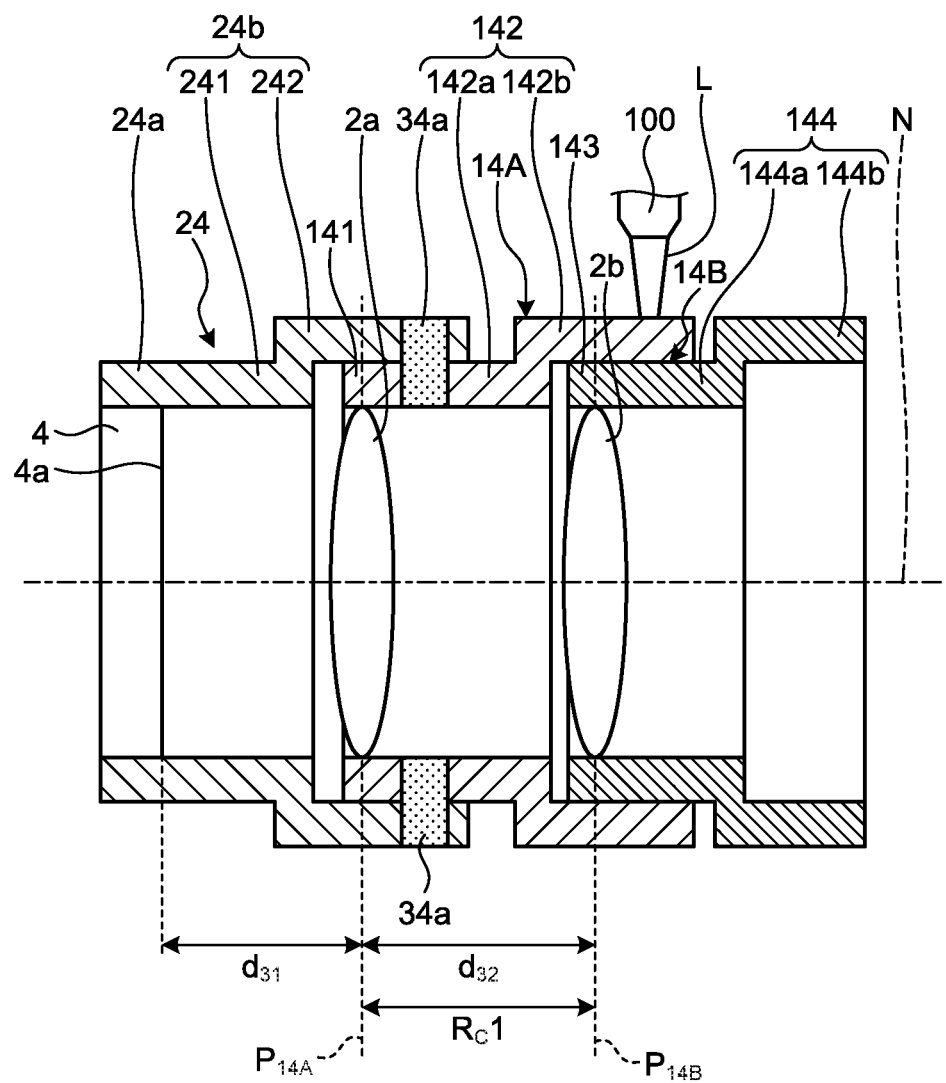
FIG. 14 is a schematic diagram for explaining the manufacturing of the optical unit according to the third embodiment.
Figure 15:
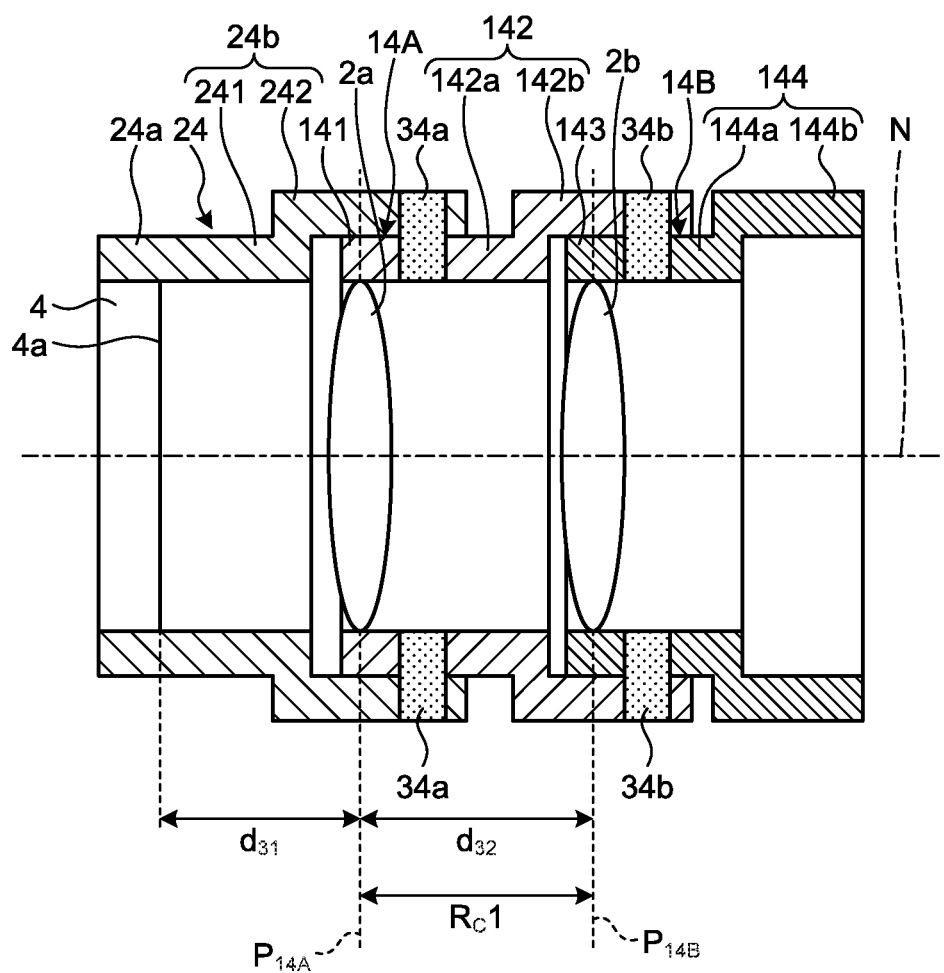
FIG. 15 is a schematic diagram for explaining the manufacturing of the optical unit according to the third embodiment.

Then, the first main body portion 144a of the second lens holder 14B is inserted into the second main body portion 142b of the first lens holder 14A from the first holding portion 143 side (refer to FIG. 14). Thereafter, the position of the second lens holder 14B with respect to the first lens holder 14A is adjusted so that the distance $d_{32}$ between the lens 2a and the lens 2b is a distance satisfying the optical conditions.

Thereafter, a part of the first lens holder 14A and a part of the second lens holder 14B are melted and solidified by arranging the laser head 100 and irradiating the outer surface of the second main body portion 142b of the first lens holder 14A with the laser light L. The irradiation position of the laser light L at this time is a portion in which the first fitting portion 142 and the first fitting portion 144 overlap each other in the radial direction, and is located outside the region $R_C1$ interposed between the holding surface $P_{14A}$ of the first holding portion 141 and the holding surface $P_{14B}$ of the first holding portion 143. As a result, the welded portion 34b is formed to bond the first lens holder 14A and the second lens holder 14B to each other (refer to FIG. 15).

Figure 16:
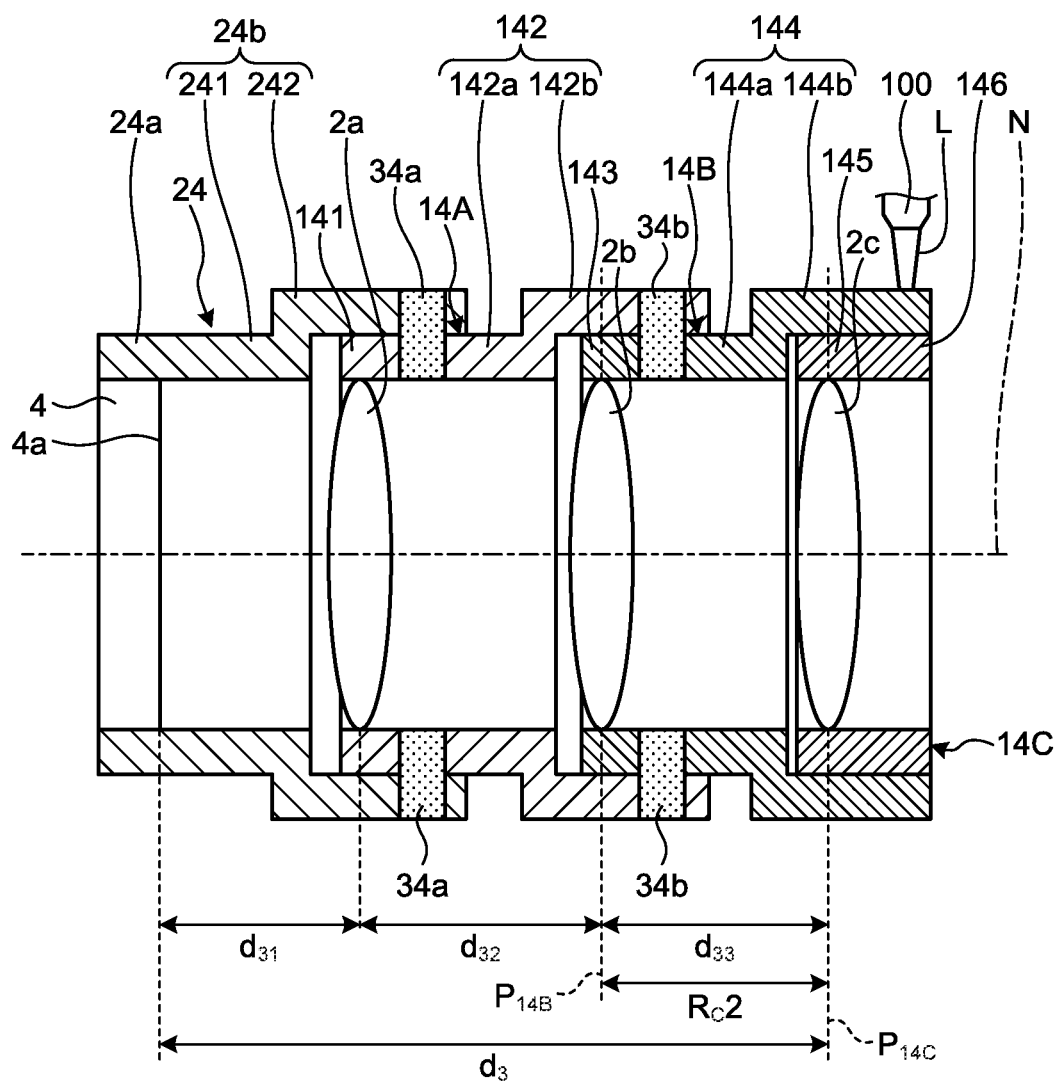
FIG. 16 is a schematic diagram for explaining the manufacturing of the optical unit according to the third embodiment.

Then, the third lens holder 14C is inserted into the second main body portion 144b of the second lens holder 14B from the first holding portion 145 side (refer to FIG. 16). Thereafter, the position of the third lens holder 14C with respect to the second lens holder 14B is adjusted so that the distance $d_{33}$ between the lens 2b and the lens 2c is a distance satisfying the optical conditions.

Thereafter, a part of the second lens holder 14B and a part of the third lens holder 14C are melted and solidified by arranging the laser head 100 and irradiating the outer surface of the second main body portion 144b of the second lens holder 14B with the laser light L. The emission position of the laser light L at this time is a portion in which the first fitting portion 144 and the first fitting portion 146 overlap each other in the radial direction, and is located outside the region $R_C2$ interposed between the holding surface $P_{14B}$ of the first holding portion 143 and the holding surface $P_{14C}$ of the first holding portion 145. As a result, as illustrated in FIG. 11, the welded portion 34c is formed to bond the second lens holder 14B and the third lens holder 14C to each other.

In this manner, by performing laser welding according to the arrangement of the optical devices held by the respective holders, it is possible to bond the holders to each other while suppressing changes in the distance $d_{31}$ between the lens 2a and the light receiving surface 4a, the distance $d_{32}$ between the lens 2a and the lens 2b, the distance $d_{33}$ between the lens 2b and the lens 2c, and a distance $d_3$ (=$d_{31}$+$d_{32}$+$d_{33}$) from the lens 2c to the light receiving surface 4a.

In the third embodiment described above, in the same manner as in the first embodiment, a welded portion is formed by irradiating the outside of a region interposed by the holding surfaces of holding portions of holders that overlap each other and are adjacent to each other in the direction of the optical axis N with laser light, so that the holders adjacent to each other in the direction of the optical axis N are bonded to each other. Therefore, when laser welding is performed, the contraction amounts and the movement directions of the holders to be bonded to each other become the same. As a result, even if contraction occurs due to melting and solidification, it is possible to weld the first lens holder 14A, the second lens holder 14B, and the third lens holder 14C and the sensor holder 24 together while suppressing the relative positional shift between the optical devices held by the respective holders. As described above, according to the present third embodiment, even in a case where holders are bonded to each other by welding, it is possible to obtain an optical unit having desired optical characteristics.

In addition, according to the third embodiment described above, since the first lens holder 14A, the second lens holder 14B, and the sensor holder 24 having the same maximum diameter at the outer periphery are connected to each other in a stepped shape, it is possible to increase the number of lens holders to be connected without increasing the diameter of the optical unit.

In addition, in the third embodiment described above, the optical unit 1D includes three lens holders. However, the present disclosure can also be applied to a configuration including two lens holders or four or more lens holders.

Fourth Embodiment

Figure 17:
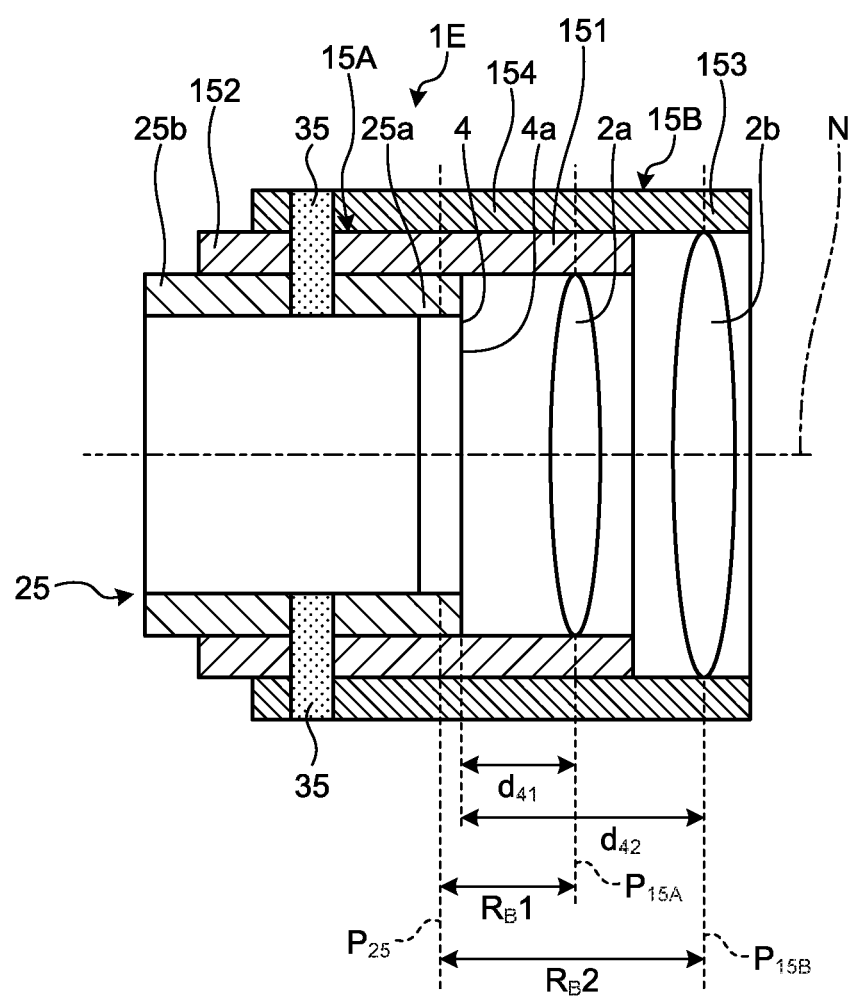
FIG. 17 is a cross-sectional view schematically illustrating the configuration of an optical unit according to a fourth embodiment.

FIG. 17 is a cross-sectional view schematically illustrating the configuration of an optical unit according to a fourth embodiment. FIG. 17 is a partial cross-sectional view with a plane including the center axis of the optical unit as a cutting plane. In the third embodiment described above, holders adjacent to each other in the connection direction (direction of the optical axis N) are bonded to each other by laser welding. However, in the present fourth embodiment, a sensor holder and a plurality of lens holders are collectively bonded.

An optical unit 1E illustrated in FIG. 17 includes two lenses (lenses 2a and 2b) that are first optical devices, two approximately tubular lens holders (a first lens holder 15A and a second lens holder 15B) for holding the respective lenses, the above-described image sensor 4, and a tubular sensor holder 25 for holding the image sensor 4. In FIG. 17, explanation will be given on the assumption that the central axes of the first lens holder 15A and the second lens holder 15B and the central axis of the sensor holder 25 match each other and match the optical axis N of the optical unit 1E. In addition, in the first lens holder 15A, the second lens holder 15B, and the sensor holder 25, in a case where the first lens holder 15A is used as a first optical device holding body, the second lens holder 15B and the sensor holder 25 are second optical device holding bodies.

The first lens holder 15A has an annular first holding portion 151 for holding the lens 2a and a first fitting portion 152 that extends in the direction of the optical axis N from an end portion of the first holding portion 151 in the direction of the optical axis N toward the image sensor 4 and is fitted to the second lens holder 15B and the sensor holder 25. The lens 2a is fixed to the first holding portion 151 by soldering or adhesion using an adhesive, for example.

The second lens holder 15B has an annular first holding portion 153 for holding the lens 2b and a first fitting portion 154 that extends in the direction of the optical axis N from an end portion of the first holding portion 153 in the direction of the optical axis N toward the lens 2a, is fitted to the first lens holder 15A, and holds the sensor holder 25 through the first lens holder 15A. The diameter of the inner periphery of the second lens holder 15B is almost the same as the diameter of the outer periphery of the first lens holder 15A, and may be any diameter as long as the first lens holder 15A can be fitted. The lens 2b is fixed to the first holding portion 153 by soldering or adhesion using an adhesive, for example.

The sensor holder 25 has an annular second holding portion 25a for holding the image sensor 4 and a second fitting portion 25b that extends in the direction of the optical axis N from an end portion of the second holding portion 25a in the direction of the optical axis N toward a side opposite to the lens 2a side and is fitted to the first lens holder 15A. The diameter of the outer periphery of the sensor holder 25 is almost the same as the diameter of the inner periphery of the first lens holder 15A, and may be any diameter as long as the sensor holder 25 can be fitted into the first lens holder 15A. The image sensor 4 is fixed to the second holding portion 25a by laser welding, for example.

In the optical unit 1E, the sensor holder 25 is fixed in a state in which the sensor holder 25 is inserted in the first fitting portion 152 of the first lens holder 15A from the second holding portion 25a side. In the optical unit 1E, the relative positions of the first lens holder 15A and the sensor holder 25 are adjusted so that a distance $d_{41}$ between the lens 2a and the light receiving surface 4a of the image sensor 4 is a distance satisfying the optical conditions set in advance.

In addition, in the optical unit 1E, the first lens holder 15A is fixed in a state in which the first fitting portion 154 of the second lens holder 15B from the first holding portion 151 side. In the optical unit 1E, the relative positions of the second lens holder 15B and the sensor holder 25 are adjusted so that a distance $d_{42}$ between the lens 2b and the light receiving surface 4a of the image sensor 4 is a distance satisfying the optical conditions set in advance.

The first lens holder 15A, the second lens holder 15B, and the sensor holder 25 are bonded by melting and solidification using laser light in a region where all of the first lens holder 15A, the second lens holder 15B, and the sensor holder 25 overlap each other along a direction perpendicular to the direction of the optical axis N. Specifically, the first lens holder 15A, the second lens holder 15B, and the sensor holder 25 are bonded to each other by melting and solidification using laser light in a portion, in which the first fitting portion 152, the first fitting portion 154, and the second fitting portion 25b overlap each other in the radial direction and which is outside a region $R_B1$ interposed between a holding surface $P_{15A}$ of the first holding portion 151 and a holding surface $P_{25}$ of the second holding portion 25a in the direction of the optical axis N, and a portion, in which the first fitting portion 152, the first fitting portion 154, and the second fitting portion 25b overlap each other in the radial direction and which is outside a region $R_B2$ interposed between a holding surface $P_{15B}$ of the first holding portion 153 and the holding surface $P_{25}$ of the second holding portion 25a in the direction of the optical axis N. The "holding surface $P_{15A}$" referred to herein is a plane that passes through the center of a portion, at which the first holding portion 151 is in contact with the lens 2a, in the direction of the optical axis N and is perpendicular to the optical axis N. The "holding surface $P_{15B}$" referred to herein is a plane that passes through the center of a portion, at which the first holding portion 153 is in contact with the lens 2b, in the direction of the optical axis N and is perpendicular to the optical axis N. In addition, the "holding surface $P_{25}$" is a plane that passes through the center of a portion, at which the second holding portion 25a is in contact with the image sensor 4, in the direction of the optical axis N and is perpendicular to the optical axis N. By this laser welding, in the first lens holder 15A, the second lens holder 15B, and the sensor holder 25, a welded portion 35 is formed by mixing and curing respective molten portions. In addition, the lenses 2a and 2b and the image sensor 4 are held by the first lens holder 15A, the second lens holder 15B, and the sensor holder 25, respectively, on the same side with respect to the welded portion 35. In the welded portion 35, similarly to the welded portion 31 described above, the welding width of a central portion in the thickness direction of the first lens holder 15A, the welding width of a central portion in the thickness direction of the second lens holder 15B, and the welding width of a central portion in the thickness direction of the sensor holder 25 are almost the same.

In the fourth embodiment described above, by irradiating a portion in which all of the first lens holder 15A, the second lens holder 15B, and the sensor holder 25 overlap each other in the radial direction perpendicular to the direction of the optical axis N and which is outside a region interposed between the holding surface of a holding portion for holding a device on one end side in the direction of the optical axis N and the holding surface of a holding portion for holding a device on the other end side with laser light, the welded portion 35 having the same welding width is formed to bond the holders to each other. Therefore, when laser welding is performed, the contraction amounts and the movement directions of the holders to be bonded to each other become the same. As a result, even if contraction occurs due to melting and solidification, it is possible to weld the first lens holder 15A, the second lens holder 15B, and the sensor holder 25 together while suppressing the relative positional shift between the optical devices held by the respective holders. As described above, according to the present fourth embodiment, even in a case where holders are bonded to each other by welding, it is possible to obtain an optical unit having desired optical characteristics.

Fifth Embodiment

Figure 18:
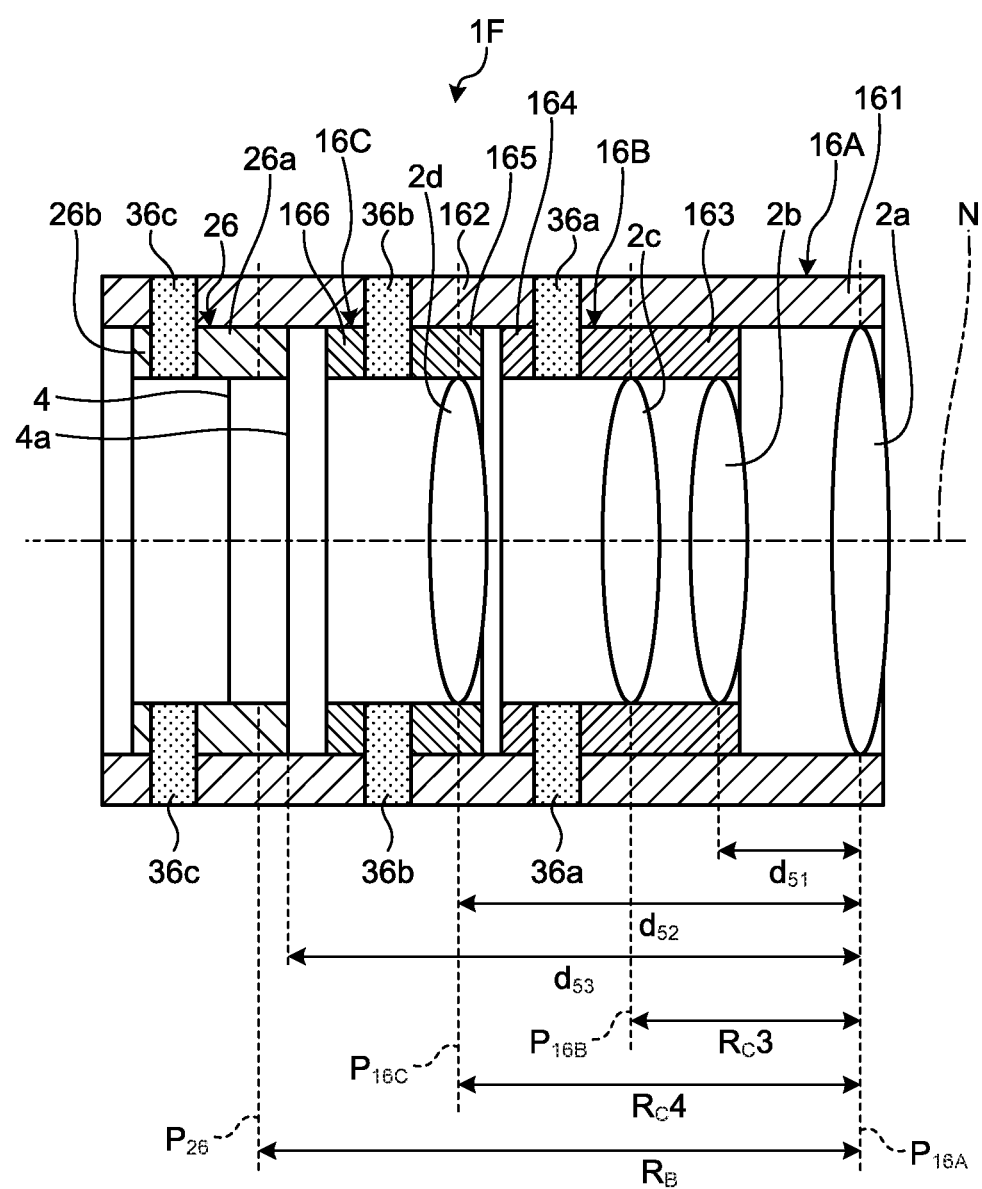
FIG. 18 is a cross-sectional view schematically illustrating the configuration of an optical unit according to a fifth embodiment.

FIG. 18 is a cross-sectional view schematically illustrating the configuration of an optical unit according to a fifth embodiment. FIG. 18 is a partial cross-sectional view with a plane including the center axis of the optical unit as a cutting plane. In the present fifth embodiment, a plurality of lens holders and one sensor holder are provided, and other lens holders and the sensor holder are housed inside a predetermined lens holder.

An optical unit 1F illustrated in FIG. 18 includes four lenses (lenses 2a, 2b, 2c, and 2d) each of which is a first optical device, an approximately tubular first lens holder 16A for holding the lens 2a, an approximately tubular second lens holder 16B for holding the lenses 2b and 2c, an approximately tubular third lens holder 16C for holding the lens 2d, the above-described image sensor 4, and a tubular sensor holder 26 for holding the image sensor 4. In FIG. 18, explanation will be given on the assumption that the central axes of the first lens holder 16A, the second lens holder 16B, and the third lens holder 16C and the central axis of the sensor holder 26 match each other and match the optical axis N of the optical unit 1F. In addition, in the first lens holder 16A, the second lens holder 16B, the third lens holder 16C, and the sensor holder 26, in a case where the first lens holder 16A is used as a first optical device holding body, the second lens holder 16B, the third lens holder 16C, and the sensor holder 26 are second optical device holding bodies.

The first lens holder 16A has an annular first holding portion 161 for holding the lens 2a and a first fitting portion 162 that extends in the direction of the optical axis N from an end portion of the first holding portion 161 in the direction of the optical axis N toward the lens 2b and is fitted to the second lens holder 16B, the third lens holder 16C, and the sensor holder 26. The lens 2a is fixed to the first holding portion 161 by soldering or adhesion using an adhesive, for example.

The second lens holder 16B has an annular first holding portion 163 for holding the lenses 2b and 2c and a first fitting portion 164 that extends in the direction of the optical axis N from an end portion of the first holding portion 163 in the direction of the optical axis N toward the lens 2d and is fitted to the first lens holder 16A. The diameter of the outer periphery of the second lens holder 16B is almost the same as the diameter of the inner periphery of the first lens holder 16A, and may be any diameter as long as the second lens holder 16B can be fitted into the first lens holder 16A. The lenses 2b and 2c are fixed to the first holding portion 163 by soldering or adhesion using an adhesive, for example.

The third lens holder 16C has an annular first holding portion 165 for holding the lens 2d and a first fitting portion 166 that extends in the direction of the optical axis N from an end portion of the first holding portion 165 in the direction of the optical axis N toward the image sensor 4 and is fitted to the first lens holder 16A. The diameter of the outer periphery of the third lens holder 16C is almost the same as the diameter of the inner periphery of the first lens holder 16A, and may be any diameter as long as the third lens holder 16C can be fitted into the first lens holder 16A. The lens 2d is fixed to the first holding portion 165 by soldering or adhesion using an adhesive, for example.

The sensor holder 26 has an annular second holding portion 26a for holding the image sensor 4 and a second fitting portion 26b that extends in the direction of the optical axis N from an end portion of the second holding portion 26a in the direction of the optical axis N toward a side opposite to the lens 2d side and is fitted to the first lens holder 16A. The diameter of the outer periphery of the sensor holder 26 is almost the same as the diameter of the inner periphery of the first lens holder 16A, and may be any diameter as long as the sensor holder 26 can be fitted into the first lens holder 16A. The image sensor 4 is fixed to the second holding portion 26a by laser welding, for example.

In the optical unit 1F, the second lens holder 16B is fixed in a state in which the second lens holder 16B is inserted into the first lens holder 16A. In the optical unit 1F, the relative positions of the first lens holder 16A and the second lens holder 16B are adjusted so that a distance $d_{51}$ between the lens 2a and the lens 2b is a distance satisfying the optical conditions set in advance. In addition, the first lens holder 16A and the second lens holder 16B are bonded to each other by melting and solidifying a portion, in which the first fitting portion 162 and the first fitting portion 164 overlap each other in the radial direction and which is outside a region $R_C3$ interposed between a holding surface $P_{16A}$ of the first holding portion 161 and a holding surface $P_{16B}$ of the first holding portion 163 in the direction of the optical axis N, with laser light. The "holding surface $P_{16A}$" referred to herein is a plane that passes through the center of a portion, at which the first holding portion 161 is in contact with the lens $2a$, in the direction of the optical axis N and is perpendicular to the optical axis N. In addition, the "holding surface $P_{16B}$" referred to herein is a plane that passes through the center of a portion, at which the first holding portion 163 is in contact with the lens $2c$, in the direction of the optical axis N and is perpendicular to the optical axis N. In a case where the optical device has a plurality of elements, the region $R_C3$ is a region having the most distant elements as ends. In this case, in the region $R_C3$, the center of a portion in contact with the lens $2a$ and the center of a portion in contact with the lens $2c$ are both ends. By this laser welding, in the first lens holder 16A and the second lens holder 16B, a welded portion 36a is formed by mixing and curing respective molten portions. In addition, the lens $2a$ and the lenses $2b$ and $2c$ are held by the first lens holder 16A and the second lens holder 16B, respectively, on the same side with respect to the welded portion 36a. In the welded portion 36a, similarly to the welded portion 31 described above, the welding width of a central portion in the thickness direction of the first lens holder 16A and the welding width of a central portion in the thickness direction of the second lens holder 16B are almost the same.

In addition, in the optical unit 1F, the third lens holder 16C is fixed in a state in which the third lens holder 16C is inserted into the first lens holder 16A. In the optical unit 1F, the relative positions of the first lens holder 16A and the third lens holder 16C are adjusted so that a distance $d_{52}$ between the lens $2a$ and the lens $2d$ is a distance satisfying the optical conditions set in advance. In addition, the first lens holder 16A and the third lens holder 16C are bonded to each other by melting and solidifying a portion, in which the first fitting portion 162 and the first fitting portion 166 overlap each other in the radial direction and which is outside a region $R_C4$ interposed between a holding surface $P_{16A}$ of the first holding portion 161 and a holding surface $P_{16C}$ of the first holding portion 165 in the direction of the optical axis N, with laser light. The "holding surface $P_{16C}$" referred to herein is a plane that passes through the center of a portion, at which the first holding portion 165 is in contact with the lens $2d$, in the direction of the optical axis N and is perpendicular to the optical axis N. By this laser welding, in the first lens holder 16A and the third lens holder 16C, a welded portion 36b is formed by mixing and curing respective molten portions. In addition, the lens $2a$ and the lens $2d$ are held by the first lens holder 16A and the third lens holder 16C, respectively, on the same side with respect to the welded portion 36b. In the welded portion 36b, similarly to the welded portion 31 described above, the welding width of a central portion in the thickness direction of the first lens holder 16A and the welding width of a central portion in the thickness direction of the third lens holder 16C are almost the same.

In addition, in the optical unit 1F, the sensor holder 26 is fixed in a state in which the sensor holder 26 is inserted in the first lens holder 16A. In the optical unit 1F, the relative positions of the first lens holder 16A and the sensor holder 26 are adjusted so that a distance $d_{53}$ between the lens $2a$ and the light receiving surface $4a$ of the image sensor 4 is a distance satisfying the optical conditions set in advance. In addition, the first lens holder 16A and the sensor holder 26 are bonded to each other by melting and solidifying a portion, in which the first fitting portion 162 and the second fitting portion 26b overlap each other in the radial direction and which is outside a region $R_B$ interposed between a holding surface $P_{16A}$ of the first holding portion 161 and a holding surface $P_{26}$ of the second holding portion 26a in the direction of the optical axis N, with laser light. The "holding surface $P_{26}$" referred to herein is a plane that passes through the center of a portion, at which the second holding portion 26a is in contact with the image sensor 4, in the direction of the optical axis N and is perpendicular to the optical axis N. By this laser welding, in the first lens holder 16A and the sensor holder 26, a welded portion 36c is formed by mixing and curing respective molten portions. In addition, the lens $2a$ and the image sensor 4 are held by the first lens holder 16A and the sensor holder 26, respectively, on the same side with respect to the welded portion 36c. In the welded portion 36c, similarly to the welded portion 31 described above, the welding width of a central portion in the thickness direction of the first lens holder 16A and the welding width of a central portion in the thickness direction of the sensor holder 26 are almost the same.

Next, a method of manufacturing the above-described optical unit 1F will be described with reference to FIGS. 19 to 23. FIGS. 19 to 23 are schematic diagrams for explaining the manufacturing of the optical unit according to the fifth embodiment.

Figure 19:
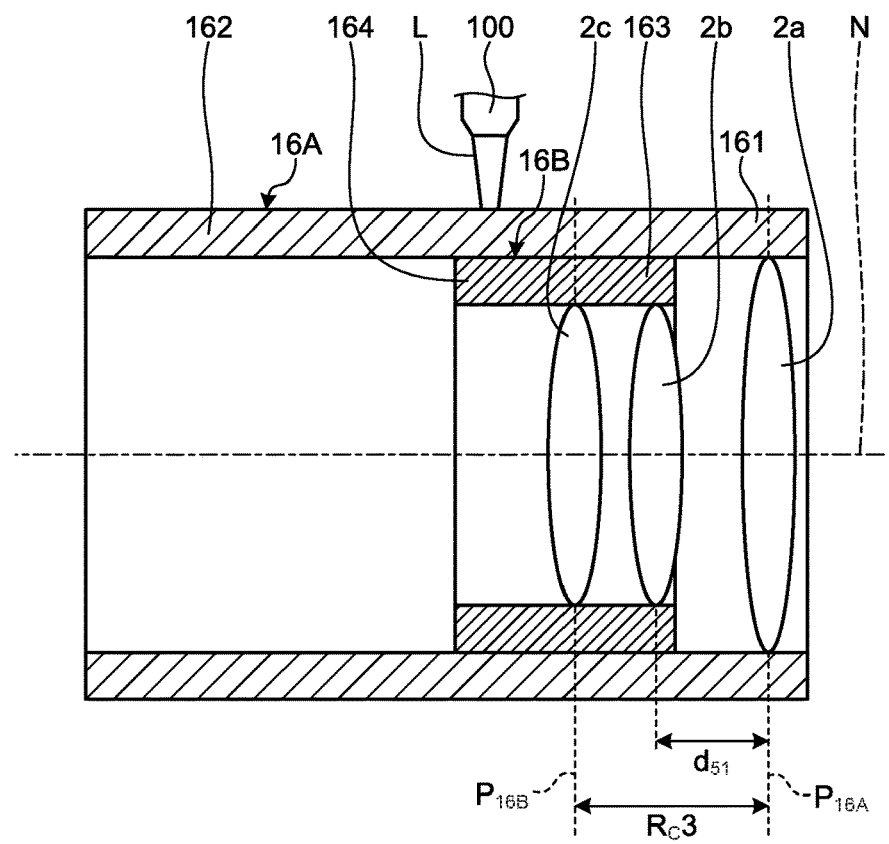
FIG. 19 is a schematic diagram for explaining the manufacturing of the optical unit according to the fifth embodiment.
Figure 20:
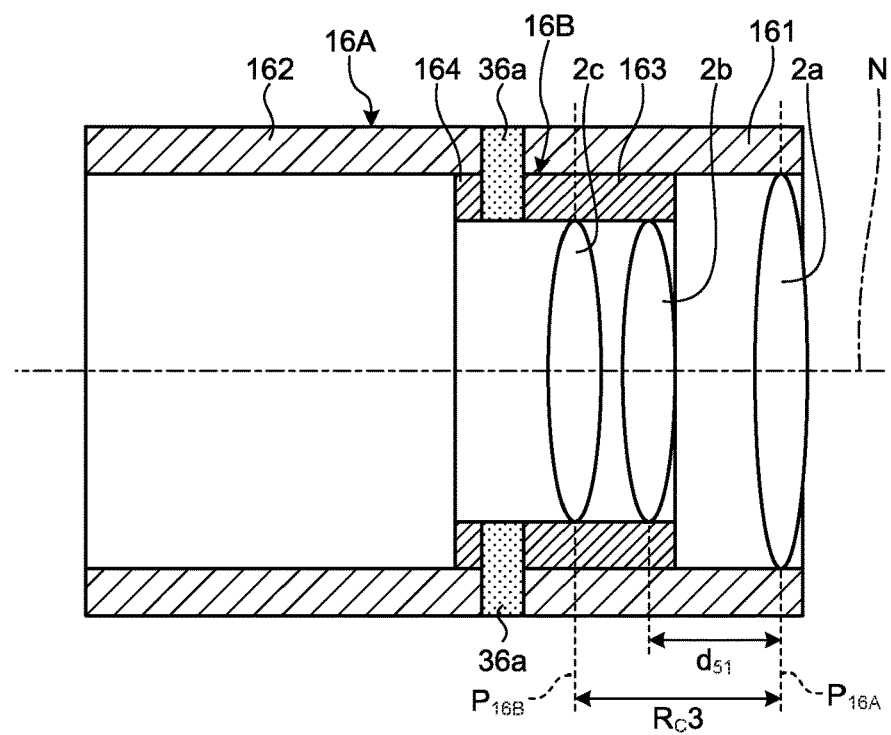
FIG. 20 is a schematic diagram for explaining the manufacturing of the optical unit according to the fifth embodiment.

First, the second lens holder 16B is inserted into the first lens holder 16A from the first holding portion 163 side (refer to FIG. 19). Thereafter, the position of the second lens holder 16B with respect to the first lens holder 16A is adjusted so that the distance $d_{51}$ between the lens $2a$ and the lens $2b$ is a distance satisfying the optical conditions.

Thereafter, a part of the first lens holder 16A and a part of the second lens holder 16B are melted and solidified by arranging the laser head 100 and irradiating the outer surface of the first lens holder 16A with laser light L. The emission position of the laser light L at this time is a portion where the first fitting portion 162 and the first fitting portion 164 overlap each other in the radial direction, and is a position outside the region $R_C3$ described above. As a result, the welded portion 36a is formed to bond the first lens holder 16A and the second lens holder 16B to each other (refer to FIG. 20).

Figure 21:
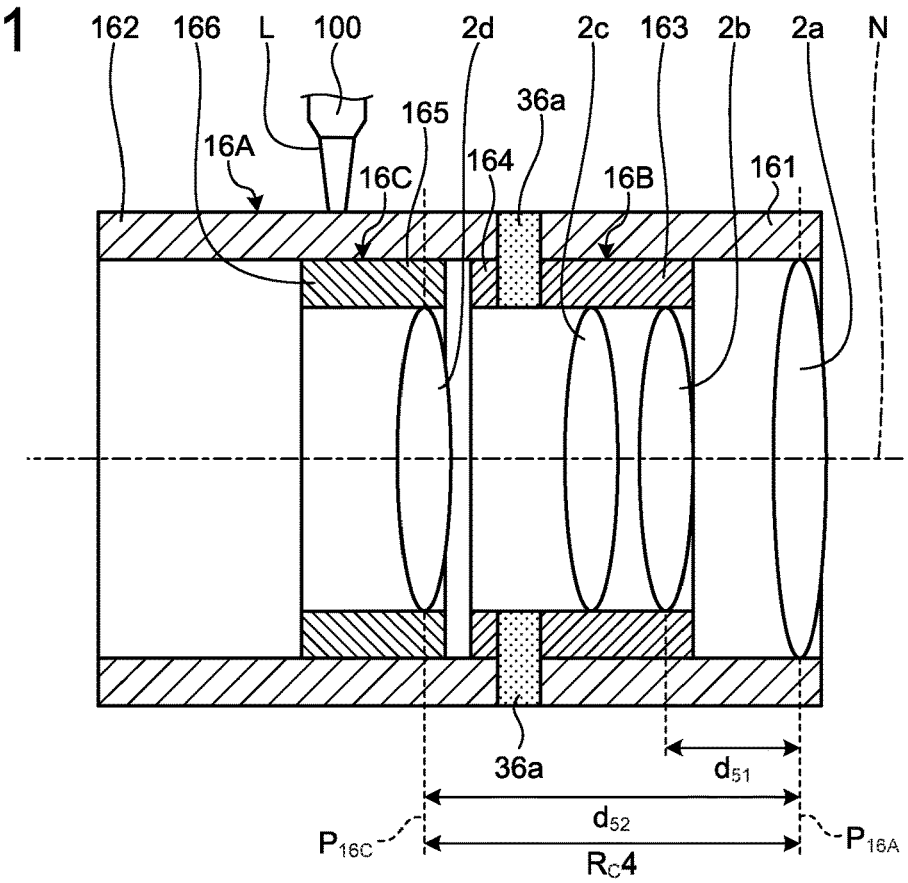
FIG. 21 is a schematic diagram for explaining the manufacturing of the optical unit according to the fifth embodiment.
Figure 22:
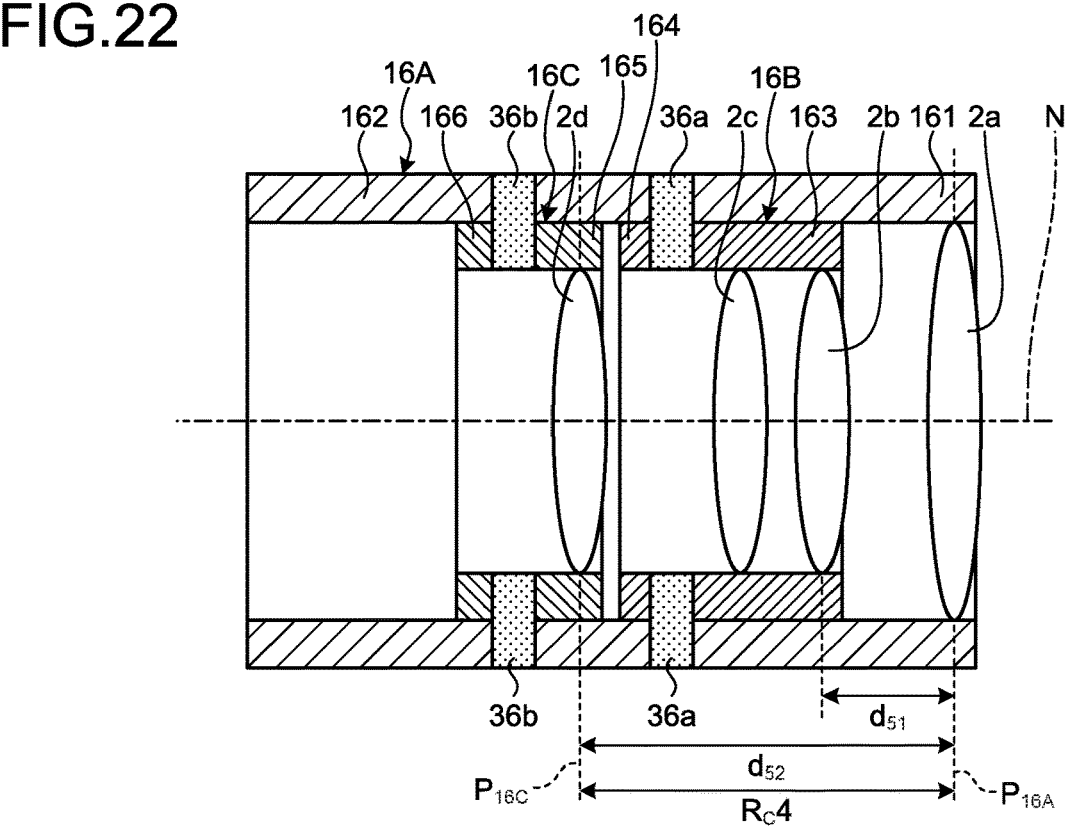
FIG. 22 is a schematic diagram for explaining the manufacturing of the optical unit according to the fifth embodiment.

Then, the third lens holder 16C is inserted into the first lens holder 16A (refer to FIG. 21). Thereafter, the position of the third lens holder 16C with respect to the first lens holder 16A is adjusted so that the distance $d_{52}$ between the lens $2a$ and the lens $2d$ is a distance satisfying the optical conditions.

Thereafter, a part of the first lens holder 16A and a part of the third lens holder 16C are melted and solidified by arranging the laser head 100 and irradiating the outer surface of the first lens holder 16A with the laser light L. The emission position of the laser light L at this time is a portion where the first fitting portion 162 and the first fitting portion 166 overlap each other in the radial direction, and is a position outside the region $R_O4$ described above. As a result, the welded portion 36b is formed to bond the first lens holder 16A and the third lens holder 16C to each other (refer to FIG. 22).

Figure 23:
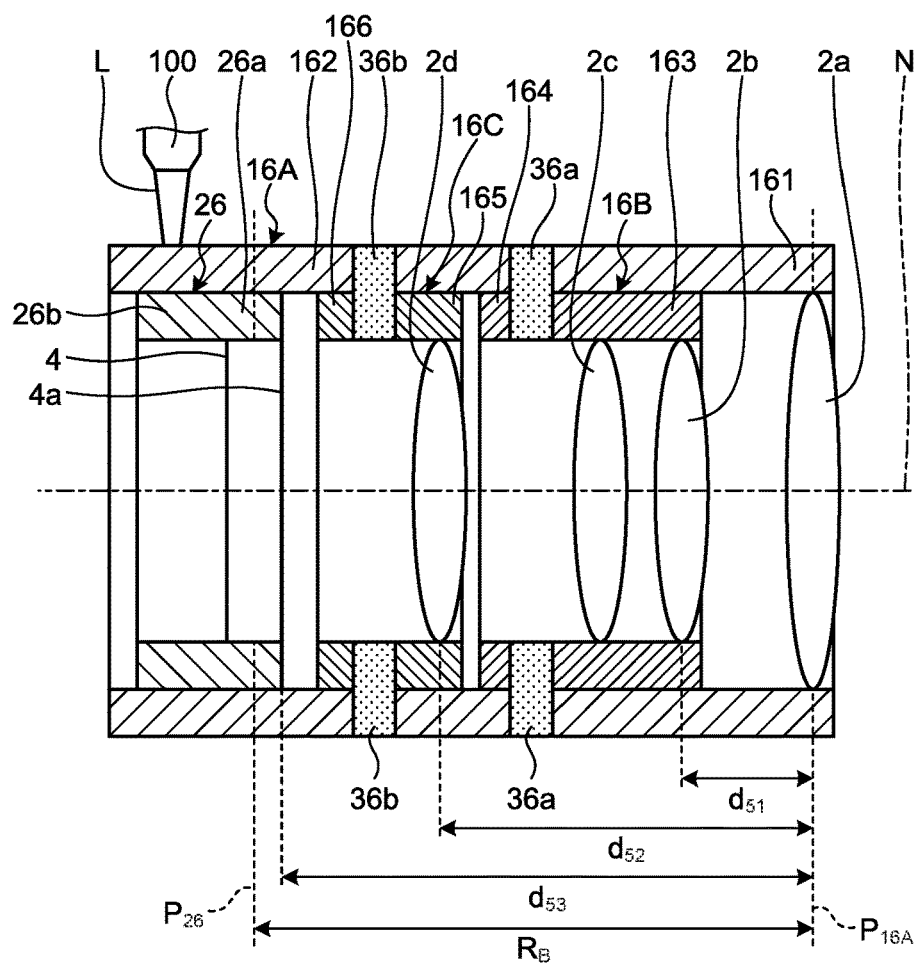
FIG. 23 is a schematic diagram for explaining the manufacturing of the optical unit according to the fifth embodiment.

Then, the sensor holder 26 is inserted into the first lens holder 16A (refer to FIG. 23). Thereafter, the position of the sensor holder 26 with respect to the first lens holder 16A is adjusted so that the distance $d_{53}$ between the lens $2a$ and the light receiving surface $4a$ of the image sensor 4 is a distance satisfying the optical conditions.

Thereafter, a part of the first lens holder 16A and a part of the sensor holder 26 are melted and solidified by arranging the laser head 100 and irradiating the outer surface of the first lens holder 16A with the laser light L. The emission position of the laser light L at this time is a portion where the first fitting portion 162 and the second fitting portion 26b overlap each other in the radial direction, and is a position outside the region $R_B$. As a result, as illustrated in FIG. 18, the welded portion 36c is formed to bond the first lens holder 16A and the sensor holder 26 to each other.

In this manner, by performing laser welding according to the arrangement of the optical devices held by the respective holders, it is possible to bond the holders to each other while suppressing changes in the distance $d_{51}$ between the lens 2a and the lens 2b, the distance $d_{52}$ between the lens 2a and the lens 2d, and the distance $d_{53}$ between the lens 2a and the light receiving surface 4a. In addition, although the above manufacturing method has been described on the assumption that insertion into the first lens holder 16A is performed from the second lens holder 16B, the insertion may be performed in order of the third lens holder 16C and the second lens holder 16B from the sensor holder 26.

In the fifth embodiment described above, in the same manner as in the first embodiment, by irradiating a portion in which the holders overlap each other in the radial direction perpendicular to the direction of the optical axis N and which is outside each region interposed between the holding surface of a holding portion for holding a device on one end side in the direction of the optical axis N and the holding surface of a holding portion for holding a device on the other end side with laser light, the welded portions 36a to 36c having the same welding width are formed to bond holders to be bonded to each other, among the first lens holder 16A, the second lens holder 16B, the third lens holder 16C, and the sensor holder 26, to each other. Therefore, when laser welding is performed, the contraction amounts and the movement directions of the holders to be bonded to each other become the same. As a result, even if contraction occurs due to melting and solidification, it is possible to weld the first lens holder 16A, the second lens holder 16B, and the third lens holder 16C and the sensor holder 26 together while suppressing the relative positional shift between the optical devices held by the respective holders. As described above, according to the present fifth embodiment, even in a case where holders are bonded to each other by welding, it is possible to obtain an optical unit having desired optical characteristics.

In addition, according to the fifth embodiment described above, since the second lens holder 16B, the third lens holder 16C, and the sensor holder 26 are inserted into the first lens holder 16A, it is possible to increase the number of holders without having to gradually reduce the diameters of the lenses disposed in the lens holders housed inside other holders according to the order of housing, for example.

Figure 24:
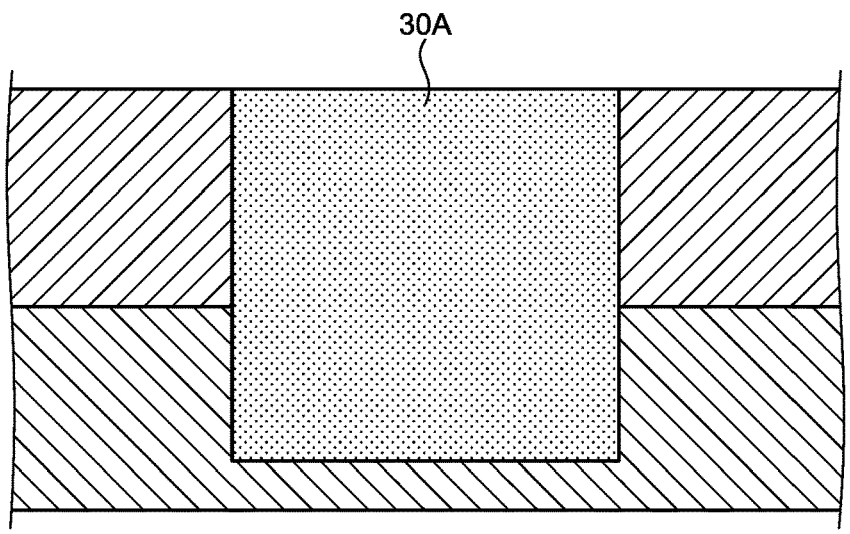
FIG. 24 is a schematic diagram for explaining another example of a welded portion formed by laser welding.
Figure 25:
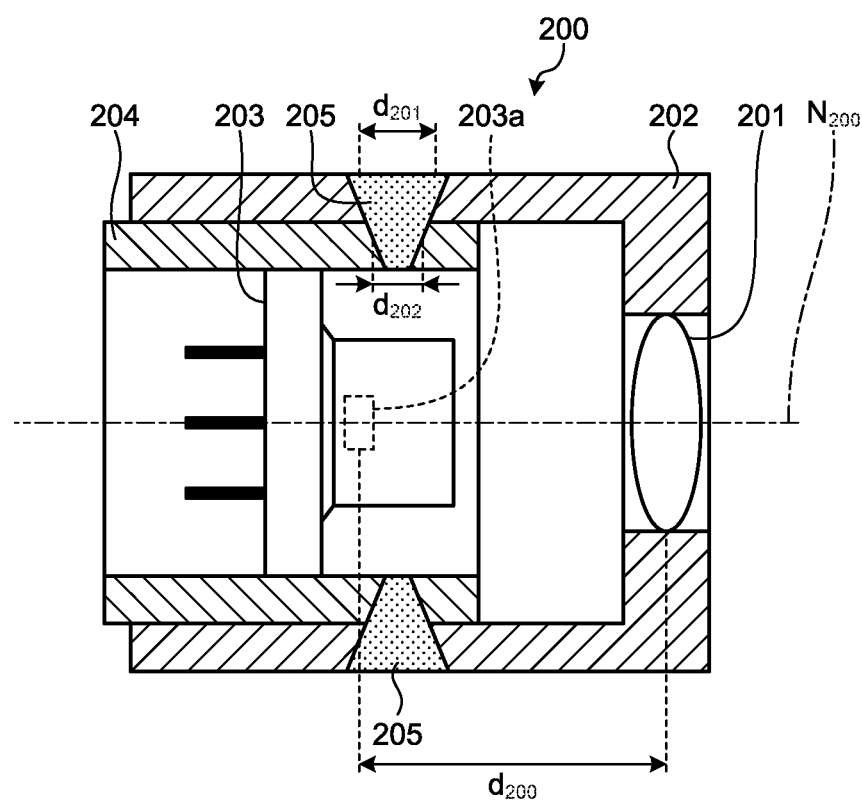
FIG. 25 is a schematic diagram illustrating the configuration of a known optical unit.

Although the embodiments for carrying out the present disclosure have been described so far, the present disclosure should not be limited only by the embodiments described above. For example, in the first to fifth embodiments described above, each of the welded portions is formed from the outer peripheral side surface of a holder on the outermost peripheral side to the inner peripheral side surface of a holder on the innermost peripheral side among members overlapping each other in a direction perpendicular to the direction of the optical axis N. However, the welded portion is not limited to this configuration. FIG. 24 is a schematic diagram for explaining another example of the welded portion formed by laser welding. For example, as illustrated in FIG. 24, a welded portion 30A may not reach the inner peripheral side surface of a holder on the innermost peripheral side.

In addition, in the first to fifth embodiments described above, the holders are bonded to each other by performing laser welding using laser light. However, the bonding method is not limited thereto. For example, known welding techniques, such as electron beam welding or resistance welding, can be used. However, in the case of using a contact type welding apparatus, it is preferable to fix a holder more firmly, as compared with a case where non-contact type welding is performed, so that positional shift between holders does not occur at the time of welding.

In addition, in the first to fifth embodiments described above, the second optical device holding body holds only the semiconductor laser or the image sensor. However, the second optical device holding body may further hold the lens that is an optical device. In this case, in the second optical device holding body, the second holding portion holds a plurality of optical devices.

In addition, each of the first and second optical devices described above is an element itself that transmits light or converts light into another energy, such as a lens, a group lens including a plurality of lenses bonded to each other or independent from each other, an optical fiber, an optical waveguide optical isolator, a semiconductor laser, a light emitting element, a light receiving element, an optical amplifier, an imaging element, and a photoelectric conversion element, or one selected from a device including any of these elements.

In addition, in the first to fifth embodiments described above, the shape of each holder viewed from the direction of the optical axis N may be a circle, an ellipse, or a polygon. Each holder may have a sleeve shape capable of holding the optical device.

In addition, in the first to fifth embodiments described above, as long as a set of holders to be bonded to each other can be bonded to each other by welding, the set of holders to be bonded to each other may have different shapes when viewed from the direction of the optical axis N, or the set of holders to be bonded to each other do not need to be fitted in all portions overlapping each other in a direction perpendicular to the optical axis N and may be fitted in parts thereof. If positioning in the direction perpendicular to the optical axis N is possible between the optical devices, there may be a gap between the overlapping portions.

Thus, the present disclosure may include various embodiments within the scope not deviating from the technical idea described in the claims.

INDUSTRIAL APPLICABILITY

As described above, the optical unit according to the present disclosure is useful for obtaining a unit having desired optical characteristics even in a case where holders for holding respective optical devices are bonded to each other by welding.

According to the present disclosure, there is an effect that it is possible to obtain an optical unit having desired optical characteristics even in a case where holders for holding respective optical devices are bonded to each other by welding.

Additional advantages and modifications will readily occur to those skilled in the art. Therefore, the disclosure in its broader aspects is not limited to the specific details and representative embodiments shown and described herein. Accordingly, various modifications may be made without departing from the spirit or scope of the general inventive concept as defined by the appended claims and their equivalents.

What is claimed is:

1. An optical unit, comprising:
 a first holder that is sleeve-shaped and that includes:

a first holding portion configured to hold therein at least one first optical device; and
a first fitting portion extending from the first holding portion;
a second holder that is sleeve-shaped and that includes:
a second holding portion configured to hold therein at least one second optical device; and
a second fitting portion extending from the second holding portion, the first fitting portion and the second fitting portion being fitted together and fixed by welding an overlapping portion at which the first fitting portion and the second fitting portion overlap each other; and
a welded portion that is melted and solidified over the first fitting portion and the second fitting portion in the overlapping portion, the welded portion being formed by piercing welding piercing mating surfaces of the first and the second fitting portions such that a first welding width at a center of the first fitting portion in a thickness direction of the first fitting portion and a second welding width at a center of the second fitting portion in a thickness direction of the second fitting portion are substantially identical to each other, the first welding width and the second welding width being widths along an optical axis direction along which an optical axis of the optical unit extends,
wherein the welded portion is provided outside of:
a first region along the optical axis direction between (i) a first holding surface, the first holding surface being a plane that is perpendicular to the optical axis and that passes through the first holding portion, and (ii) a second holding surface, the second holding surface being a plane that is perpendicular to the optical axis and that passes through the second holding portion, and
a second region along the optical axis direction that includes one of the first holding surface and the second holding surface and a respective one of the first optical device and the second optical device that is provided on the one of the first holding surface and the second holding surface.

2. The optical unit according to claim 1, wherein:
the second fitting portion is provided inward of the first fitting portion along a direction perpendicular to the optical axis direction, and
a ratio of the second welding width to the first welding width is 0.75 to 1.25.

3. The optical unit according to claim 1, wherein:
the optical unit includes a plurality of holders overlapping each other in a direction perpendicular to the optical axis direction, the plurality of holders including the first holder and the second holder,
the first holder is provided at an outermost peripheral side of the optical unit, from among the plurality of holders,
the second holder is provided at an innermost peripheral side of the optical unit, from among the plurality of holders, and
the welded portion extends from an outer peripheral side surface of the first holder, and reaches the second holder.

* * * * *